(12) United States Patent
Shida et al.

(10) Patent No.: US 6,859,612 B2
(45) Date of Patent: Feb. 22, 2005

(54) DECODER AND REPRODUCING UNIT

(75) Inventors: Tetsuro Shida, Tokyo (JP); Hideaki Kosaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 987 days.

(21) Appl. No.: 09/725,289

(22) Filed: Nov. 29, 2000

(65) Prior Publication Data

US 2001/0055469 A1 Dec. 27, 2001

(30) Foreign Application Priority Data

Jun. 26, 2000 (JP) ..................................... P2000-190645

(51) Int. Cl.$^7$ ................................................. H04N 5/91
(52) U.S. Cl. ..................................... 386/68; 348/423.1
(58) Field of Search .............................. 386/33, 46, 68, 386/81, 82, 98, 111, 112; 348/423.1

(56) References Cited

U.S. PATENT DOCUMENTS 6,078,722 A * 6/2000 Kawamura et al. ........... 386/68
6,564,004 B1 * 5/2003 Kadono ....................... 386/82
6,643,449 B1 * 11/2003 Nagata et al. ................. 386/46
6,658,199 B1 * 12/2003 Hallberg ....................... 386/68

FOREIGN PATENT DOCUMENTS

JP              146339          5/1999

* cited by examiner

*Primary Examiner*—Thai Tran
*Assistant Examiner*—Christopher Onuaku
(74) *Attorney, Agent, or Firm*—Birch, Stewart, Kolasch & Birch, LLP

(57) ABSTRACT

A slow decode control part divides a reference clock generated by a VCXO at a ratio of a slow speed to a normal speed. An STC circuit counts the divided clock. A time for starting decoding by an MPEG video decode part is decided by comparing a DTS included in MPEG data with the count of the STC circuit. A display time determination part determines a timing for outputting decoded data by comparing a PTS included in the MPEG data with the count of the STC circuit. Decoded data temporarily held in a frame buffer is output in response to a signal generated in a determination part on the basis of frame frequency information included in the MPEG data. Thus, slow reproduction is implemented with a high degree of freedom not limited to an integer-fractional speed without requiring a complicated circuit structure.

10 Claims, 13 Drawing Sheets

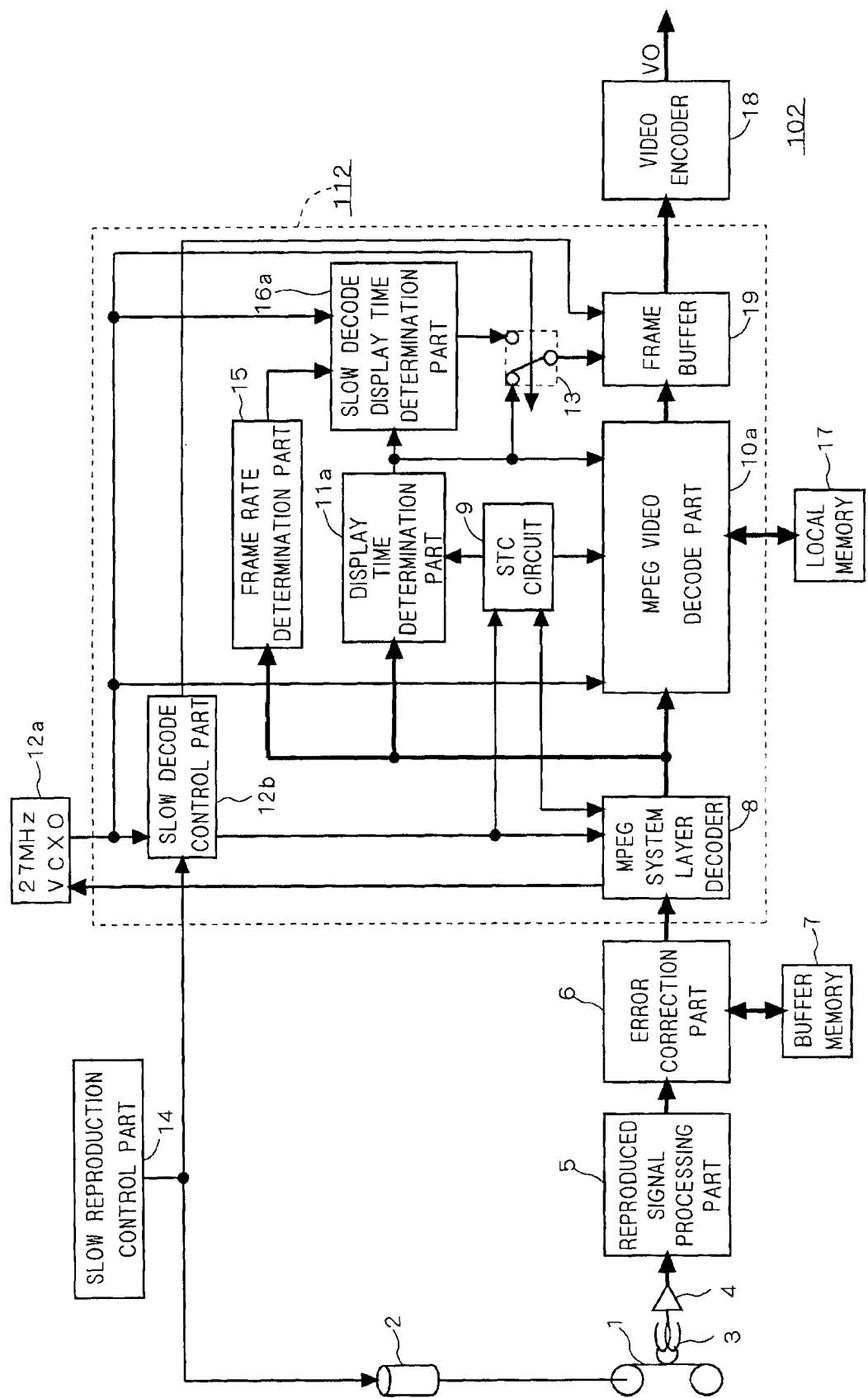
F I G. 4

FIG. 8

| TIME | DISPLAY START INSTRUCTION OUTPUT FROM DISPLAY TIME DETERMINATION PART 11b |
|---|---|
| T901 | NEXT IMAGE DISPLAY START INSTRUCTION |
| T902 | NEXT IMAGE DISPLAY START INSTRUCTION |
| T903 | NEXT IMAGE DISPLAY START INSTRUCTION |
| T904 | NEXT IMAGE DISPLAY START INSTRUCTION |
| T905 | NEXT IMAGE DISPLAY START INSTRUCTION |
| T906 | NEXT IMAGE DISPLAY START INSTRUCTION |

FIG. 9

| TIME | DISPLAY START INSTRUCTION OUTPUT FROM SLOW REPRODUCTION TIME DETERMINATION PART 16b |
|---|---|
| T921 | NEXT IMAGE DISPLAY START INSTRUCTION |
| T922 | ITERATION IMAGE DISPLAY START INSTRUCTION |
| T923 | ITERATION IMAGE DISPLAY START INSTRUCTION |
| T924 | NEXT IMAGE DISPLAY START INSTRUCTION |
| T925 | ITERATION IMAGE DISPLAY START INSTRUCTION |
| T926 | NEXT IMAGE DISPLAY START INSTRUCTION |

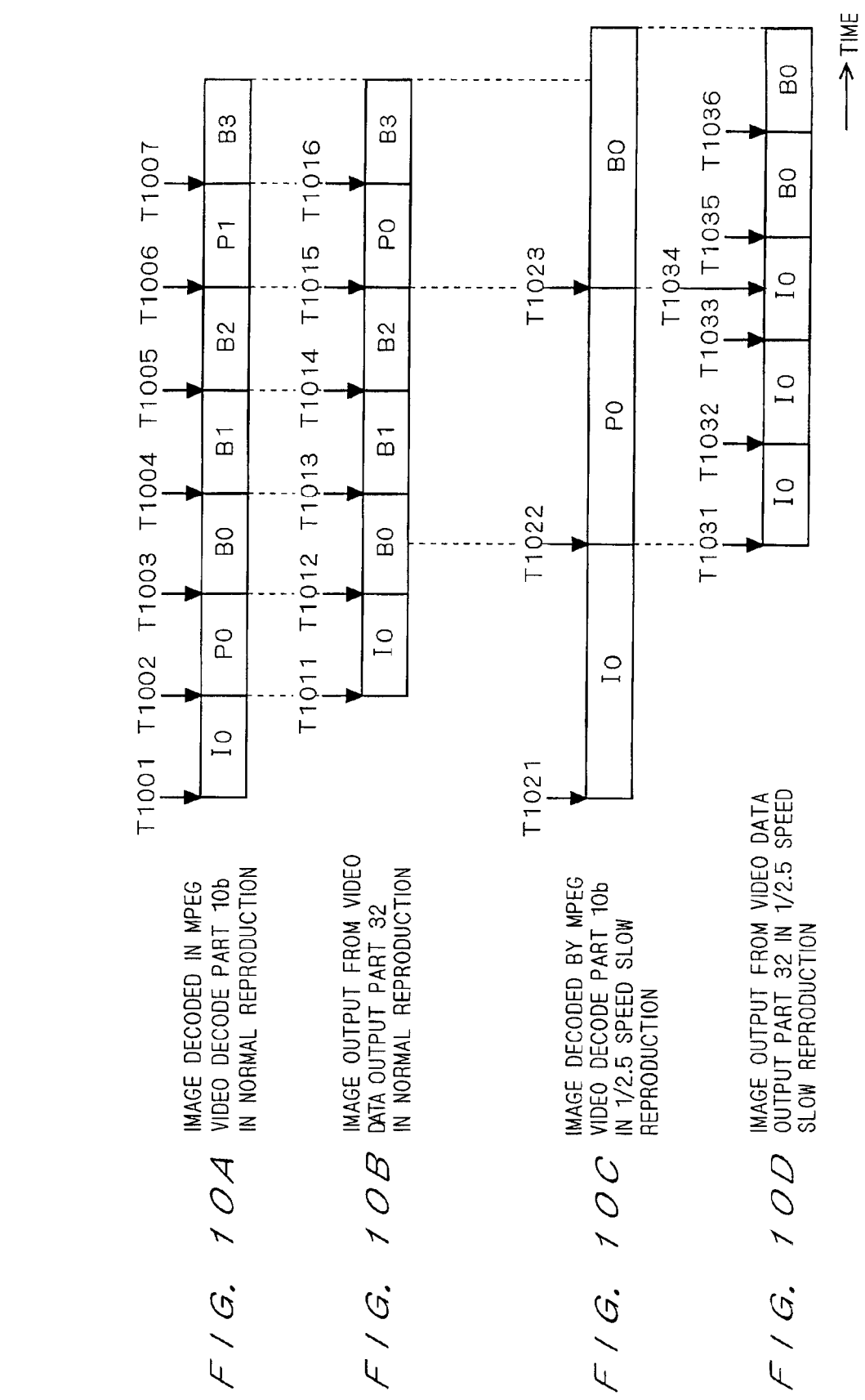

FIG. 14A (PRIOR ART) DISPLAY ORDER

FIG. 14B (PRIOR ART)

FIG. 14C (PRIOR ART) DISPLAY ORDER

FIG. 14D (PRIOR ART) DISPLAY ORDER

FIG. 14E (PRIOR ART) OUTPUT ORDER

DECODER AND REPRODUCING UNIT

BACKGROUND OF THE INVENTION

1. Field of the Invention

The present invention relates to a decoder suitable for decoding MPEG data (i.e., data decoded on the basis of the MPEG standards) and a reproducing unit comprising the decoder, and more particularly, it relates to an improvement for implementing slow decoding performed when coded data is input at a slow speed slower than a normal speed (i.e., an original speed expressed by time control information recorded in the coded data) with a simple hardware structure.

2. Description of the Background Art

FIG. 13 is a block diagram showing the structure of a conventional MPEG data reproducing unit 150. This reproducing unit 150, disclosed in Japanese Patent Application Laid-Open No. 11-146339 (1999), for example, is so structured as to perform slow decoding on MPEG data input through a magnetic tape thereby enabling slow reproduction (reproduction at a slow speed) of images. The reproducing unit 150 is built into a digital video recorder, for example.

In the reproducing unit 150, a tape 1 is a magnetic storage medium for recording and reproducing MPEG data, and a motor drive 2 is an element controlling the traveling speed of the tape 1. A reproducing head 3 reads a signal recorded in the tape 1, and a reproducing amplifier 4 amplifies the signal read by the reproducing head 3. A reproduced signal processing part 5 demodulates the signal amplified by the reproducing amplifier 4 and decodes the same as reproduced data. An error correction part 6 performs error correction of the reproduced data decoded by the reproduced signal processing part 5. A buffer memory 7 temporarily holds the reproduced data during error correction. A general reproducing buffer 20 temporarily holds the reproduced data having been subjected to error correction when performing normal reproduction (i.e., reproduction at a normal speed). An MPEG data switch 21 selects buffer output between normal reproduction and slow reproduction.

A frame frequency determination part 22 determines a frame frequency in slow reproduction. A slow reproducing buffer 23 temporarily holds the MPEG data in slow reproduction. A difference 0 B picture generation part 24 generates a B picture having a difference 0. A B picture insertion switch 25 inserts the B picture having the difference 0 in slow-reproduced data. A slow reproduction control part 26 determines the reproducing speed and controls insertion of the B picture having the difference 0 on the basis of the result of the determination of the picture type of the slow-reproduced data. A picture type determination part 27 determines the picture type of the slow-reproduced data. A data rearrange part 28 changes a time stamp, a GOP number and display order data in the MPEG data in which the B picture having the difference 0 is inserted. An MPEG system layer decoder 29 performs decoding on a system layer (MPEG-TS). A VCXO 30 generates a 27 MHz clock forming a reference for decoding the MPEG data on the basis of a control signal from the MPEG system layer decoder 29. An MPEG video decoder 31 decodes the MPEG data.

Operations of the reproducing unit 150 are now described. The signal recorded in the tape 1 is read by the reproducing head 3, amplified by the reproducing amplifier 4, subjected to signal processing such as demodulation, synchronizing signal detection and data separation in the reproduced signal processing part 5 and thereafter input in the error correction part 6. The error correction part 6 temporarily stores the input reproduced data in the buffer memory 7. The error correction part 6 performs error correction when all data of one unit to which error correction codes are added in recording are available. Thus, errors following reproduction can be substantially completely corrected.

In normal reproduction, data subjected to error correction output from the error correction part 6 is transmitted to the MPEG decoder 31 through the general reproducing buffer 20 and the switch 21. In slow reproduction, on the other hand, all signals for one track recorded in the tape 1 are reproduced by performing head scanning a plurality of times. In the case of DVCR standardized by Digital VCR Kyogikai (Japan), for example, error correction codes are added on a single track as a unit. Therefore, the error correction part 6 stores reproduced data for one track in the buffer memory 7 and performs error correction on the stored reproduced data for one track.

Figures 14A, 14B, 14C, 14D, 14E:
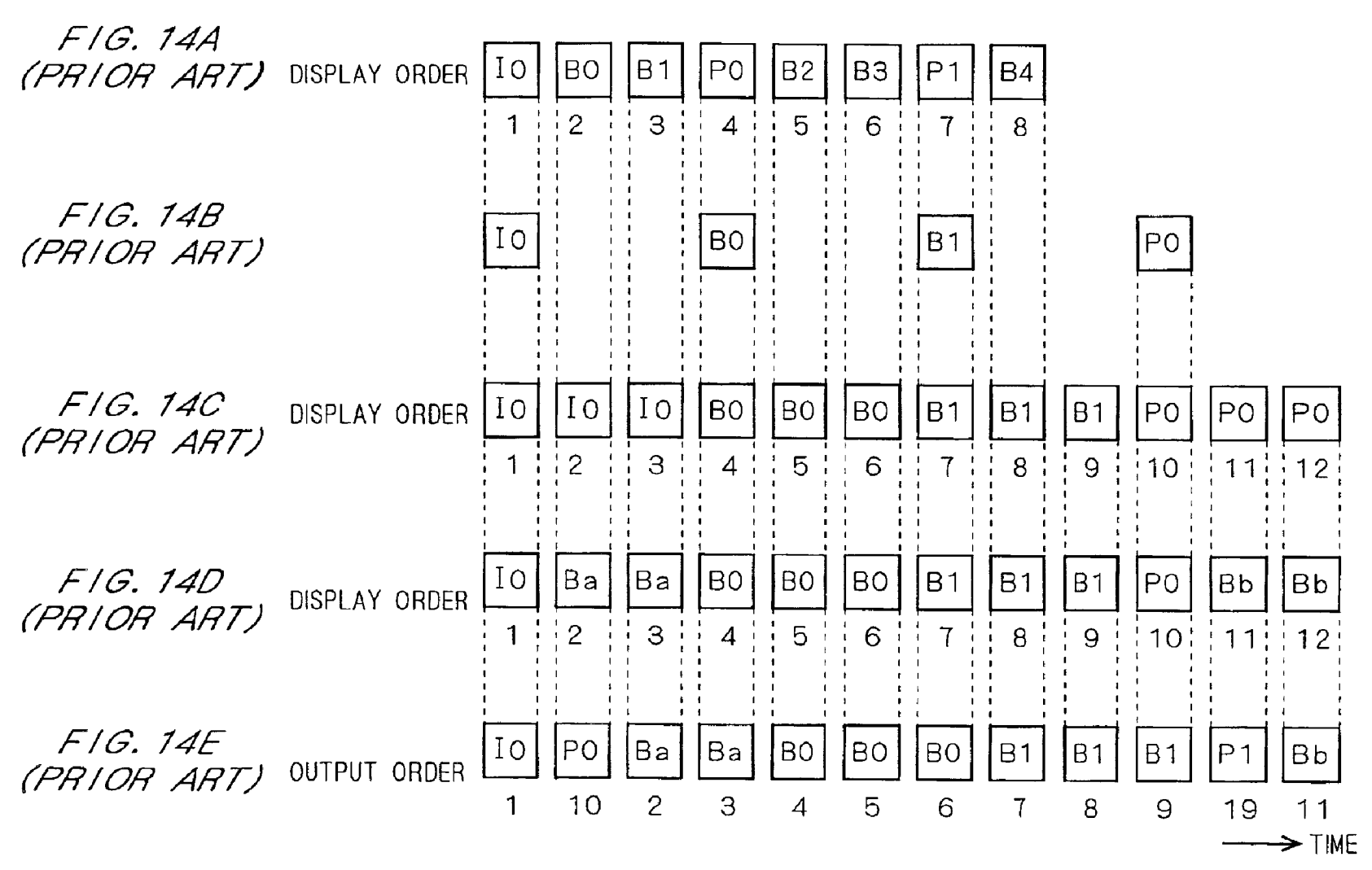

FIGS. 14A to 14E are timing charts for illustrating the operations of the reproducing unit 150 shown in FIG. 13 with the structure of image data decoded by the reproducing unit 150. Before describing operations in slow reproduction, image data to be displayed in slow reproduction and image data input in a decoder are described with reference to FIGS. 14A to 14E. A data string of FIG. 14A shows the structure of general MPEG image data. The MPEG image data is formed in display order of pictures I0, B0, B1, P0, B2, B3, P1, B4, . . . .

The picture I0 is an intra-frame coded image capable of restructuring a single frame. The picture P0 and the picture P1 are inter-frame predictive-coded images predicted from the picture I0 and the picture P0 respectively, while the pictures B0 and B1 and the pictures B2 and B3 are inter-frame predictive-coded images predicted from the pictures I0 and P0 and from the pictures P0 and P1 respectively.

When slow reproduction is performed at one third speed on the basis of the data string of FIG. 14A, only scattered data of the pictures I0, B0, B1 and P0 are present at three-frame intervals in display order as shown in a data string of FIG. 14B. When displaying the data, each frame must be repeatedly output three times as shown in a data string of FIG. 14C. However, an MPEG decoder built into a general digital broadcasting receiver or the like requires a specific device in order to receive non-standard MPEG data such as the data string of FIG. 14B having scattered frames and repeatedly display each image as shown in the data string of FIG. 14C.

When forming standard MPEG data to display a frame string such as the data string of FIG. 14C and inputting the same in the MPEG decoder, the MPEG decoder can display an excellent slow reproduced image also when the same has no specific device. Standard MPEG data displaying the frame string such as the data string of FIG. 14C is a data string of FIG. 14D. Also in the data string of FIG. 14D, the pictures are illustrated in display order similarly to the data strings of FIGS. 14A to 14C.

In the data string FIG. 14D, data of the reproduced picture I0 is first output as such without changing the contents of the data. Then, a forward-predictive B picture Ba having a difference 0 is output twice (for two frames) in order to repeatedly display the picture I0. The picture Ba, which is the forward-predictive B picture, is an inter-frame predictive-coded image predicted from a precedently displayed I or P picture. In the data string of FIG. 14D, the picture Ba is an inter-frame predictive-coded image predicted from the picture I0, and an ordinary MPEG decoder having no specific device outputs an image having a difference 0 forward-predicted from the picture I0, i.e., the same image as the frame I0 when the picture Ba is input.

In order to repeatedly display the picture I0 three times, the data of the picture I0 may be repeatedly output three times as such as in the data string of FIG. 14C. In general, however, the data quantity of an I picture is larger than those of other types of pictures, and hence a buffer may overflow on the side of the decoder when continuing the same. Therefore, the picture Ba which is the forward-predictive B picture having the difference 0 is output in the data string of FIG. 14D.

Then, the picture B0 is output as such, in order to repeatedly display the picture B0 three times with the original data contents. The picture B0 is an inter-frame predictive-coded image predicted from the precedently displayed picture I0 and the subsequently displayed picture P0. The picture I0 and the picture P0 are output as such, and hence the picture B0 is also output as such without changing its data contents. Then, the picture B0 is continuously output twice, in order to repeatedly display the picture B0 twice. For the same reason, the subsequent picture B1 is repeatedly output three times as such, in order to repeatedly display the picture B1 three times.

While the picture P0 must thereafter be repeatedly displayed three times, the data of the picture P0 may not be repeatedly output three times as such. The reason for this is as follows:

The picture P0, which is an inter-frame predictive-coded image predicted from a precedently displayed I or P picture, is an inter-frame predictive-coded image predicted from the picture I0 in this case. Assuming that dP0 represents the difference between the picture P0 and the picture I0, the picture P0 is expressed as P0=I0+dP0.

Assuming that data of the picture P0 is repeatedly output three times, the decoder receiving the second picture P0 interprets the second data P0 as difference data from a precedently displayed P picture, i.e., the picture P0, and displays not an image of the precedent picture P0 (=I0+dP0) but an image of {(I0+dP0)+dP0}.

Therefore, the picture P0 is first output as such similarly to the case of the picture I0, and thereafter a picture Bb (having the same data contents as the picture Ba), i.e., a forward-predictive B picture having a difference 0 is continuously output twice, in order to continuously display an image having a difference 0 with reference to this picture P0, i.e., the same image as the picture P0 twice.

When performing one-third-speed slow reproduction on the original image expressed in the data string of FIG. 14A, as hereinabove described, it is possible to supply image data displayed as the data string of FIG. 14C having a frame frequency equal to a display frame frequency with a standard decoder by generating image data such as the data string of FIG. 14D in display order and outputting the same. The frame string of the data string of FIG. 14D is rewritten in data output order, as shown in a data string of FIG. 14E. The pictures B0 and B1 of bi-directional prediction cannot be decoded unless data of I and P pictures subsequently located in display order are available, and hence the I and P pictures necessary for decoding the B pictures are output in advance of the picture B0 and the picture BI in the data string of FIG. 14E.

A procedure of generating the image data such as the data string of FIG. 14D is described with reference to FIG. 13 again. The error correction part 6 collects image data reproduced by slow reproduction for a single track and thereafter outputs the same. The reproducing unit 150 shown in FIG. 13 transmits data at a speed slower than an original transmission speed due to slow reproduction, and hence the data is temporarily stored in the buffer 23 for slow reproduction and input in the frame frequency determination part 22 in slow reproduction. The frame frequency determination part 22 determines a frame frequency for display from image format information included in MPEG data and inputs the result of the determination in the slow reproduction control part 26.

The slow reproduction control part 26 switches the switch 25 toward the slow reproducing buffer 23 for performing read control of the slow reproducing buffer 23 and reads data for a single picture from the slow reproducing buffer 23. When the data for a single picture is read, the picture type determination part 27 determines whether the picture data read from the slow reproducing buffer 23 is an I, P or B picture, and transmits the result of this determination to the slow reproduction control part 26. The slow reproduction control part 26 controls the switch 25 in response to the result of the determination received from the picture type determination part 27.

If the read data for a single picture is an I picture or a P picture, the slow reproduction control part 26 switches the switch 25 toward the difference 0 B picture generation part 24 for outputting a forward-predictive B picture having a difference 0. If the read data is a B picture, the slow reproduction control part 26 keeps the switch 26 on the side of the slow reproducing buffer 23 and rereads the B picture.

The slow reproduction control part 26 decides the number of times for outputting these pseudo-images. When an instruction for starting slow reproduction is input in the slow reproduction control part 26 in the aforementioned example of the one-third-speed slow generation, the slow reproduction control part 26 rotates the motor 2 for driving the tape 1 at the one third speed and inserts data of two frames with respect to one frame of read data as described above.

Thus, the switch 25 outputs an image data string such as the data string shown in FIG. 14E. Each data output from the switch 25 is transmitted to the MPEG decoders 29 and 31 through the data rearrange part 28 and the switch 21.

The data rearrange part 28 is an element changing the time stamp, the GOP number and the display order. When the time stamp (relative time for decoding and displaying image data) assigned to the original image data is one-third-speed slow reproduction, the data rearrange part 28 changes the original time to a time extended to three times and rewrites a picture number in each GOP (group of pictures) to three times. The data rearrange part 28 also rewrites display order of respective pictures in each GOP to order including the inserted pseudo-pictures Ba and Bb.

The data thus output through the switch 21 is input in the MPEG system layer decoder 29 as MPEG data having a time stamp suitable to the data transmission speed for slow reproduction. The MPEG system layer decoder 29 extracts the time stamp etc. from the input MPEG data and controls the VCXO 30 generating the system clock while taking out the image data and inputting the same in the MPEG video decoder 31. The MPEG video decoder 31 decodes the input MPEG image data and outputs projectable image data.

In the conventional MPEG data reproducing unit, however, the circuit structure for implementing slow reproduction is disadvantageously complicated as shown in FIG. 13. Further, control of each element of the device is complicated. In addition, the B picture having a difference 0 for slow reproduction is inserted in a single picture unit, and hence the MPEG data reproducing unit can basically cope with only an integer-fractional speed.

SUMMARY OF THE INVENTION

An object of the present invention is to provide an MPEG decoder implementing slow reproduction with a high degree of freedom not restricted to an integer-fractional speed without requiring a complicated circuit structure.

According to a first aspect of the present invention, a decoder comprises a decode part receiving and decoding coded data including time control information defining a time related to decoding a processing control part instructing, when the coded data is input in the decode part at a speed slower than an original speed expressed by the time control information, to start decoding the coded data per unit and start outputting decoded data per unit at a time suitable to the slower speed on the basis of the time control information, a storage part temporarily holding the decoded data output from the decode part and an output control part outputting contents for one unit from the decoded data held in the storage part in a period suitable to the original speed on the basis of the time control information.

In the decoder according to the first aspect, the processing control part controls the time for starting decoding and the time for starting outputting the decoded data per unit in the decode part to suit to the slower speed and the decoded data obtained in the decode part is output by one unit in a cycle suitable to the original speed through the storage part. Therefore, decoding is implemented at an arbitrary slow speed not limited to an integer-fractional speed without requiring a complicated circuit structure dissimilarly to the prior art.

According to a second aspect of the present invention, the processing control part includes a clock generation part generating a reference clock signal, a dividing part dividing the reference clock signal with the ratio of the slower speed to the original speed thereby generating a divided clock and a counting part counting the divided clock, and decides timings for starting the decoding and starting the output by comparing a count of the counting part with the time control information.

In the decoder according to the second aspect, the processing control part is formed by a simple circuit by employing the clock generation part, the dividing part and the counting part.

According to a third aspect of the present invention, the decode part decodes the coded data in synchronization with the divided clock.

In the decoder according to the third aspect, the decode part decodes the coded data in synchronization with the divided clock, whereby all coded data can be equally decoded at whatever slow speed the coded data is input.

According to a fourth aspect of the present invention, the decode part decodes the coded data in synchronization with the reference clock.

In the decoder according to the fourth aspect, the decode part decodes the coded data in synchronization with the reference clock having a shorter cycle than any divided clock, whereby all coded data can be equally decoded at whatever slow speed the coded data is input. Further, the time required for each unit of decoding is so short that decoded data of the newest unit of coded data can be obtained in an early stage as decoded data of one unit output from the storage part.

According to a fifth aspect of the present invention, the output control part includes another counting part counting the reference clock signal and decides the period by comparing a count of the other counting part with the time control information.

In the decoder according to the fifth aspect, the output control part is formed by a simple circuit by employing the counting part counting the reference clock signal.

According to a sixth aspect of the present invention, the output control part regards one of timings for starting output per unit decided by the processing control part as a starting point for outputting contents of the unit in the period.

In the decoder according to the sixth aspect, the output control part regards one of timings for starting output per unit decided by the processing control part as a starting point for periodically outputting contents for one unit, whereby the storage part outputs the contents for one unit of the decoded data in synchronization with the time for outputting the decoded data for one unit from the decode part on the basis of the time control information.

Preferably, the coded data is data coded on the basis of MPEG 2-TS standards, the time control information includes a program clock reference, a presentation time stamp, a decode time stamp and frame frequency information, the clock generation part adjusts frequency of the reference clock so that a time indicated by the program clock reference included in the time control information matches with a time indicated by the count of the counting part, the processing control part decides the period for starting the decoding on the basis of a result of comparison between the decode time stamp included in the time control information and the count, the processing control part decides the period for starting the output on the basis of a result of comparison between the presentation time stamp included in the time control information and the count of the counting part, and the output control part decides the cycle on the basis of a result of comparison between the frame frequency information included in the time control information and the count of the another countering part.

According to a seventh aspect of the present invention, the storage part holds a newest unit of the decoded data by updating already held data with the decoded data output from the decode part.

In the decoder according to the seventh aspect, the storage part updatingly holds the decoded data output from the decode part for holding the newest unit of decoded data, whereby the storage capacity required for the storage part can be reduced.

According to an eight aspect of the present invention, the coded data is image data including inter-frame predictive-coded data and the unit is one frame, the storage part also holds image data necessary for decoding the inter-frame predictive-coded data among the decoded data output from the decode part, and the decode part refers to the image data necessary for decoding the inter-frame predictive-coded data held by the storage part thereby decoding the inter-frame predictive-coded data.

In the decoder according to the eighth aspect, the storage part serves also as a reference storage medium for decoding the inter-frame predictive-coded data, whereby the storage capacity of the total storage medium including the storage part is reduced.

According to a ninth aspect of the present invention, a reproducing unit comprises a decoder and a reproduced signal processing part reading coded data, recorded in a recording medium, including time control information defining a time related to decoding at a speed responsive to an external instruction and inputting the coded data in the decoder, and the decoder includes a decode part receiving and decoding the coded data, a processing control part instructing, when the coded data is input in the decode part at a speed slower than an original speed expressed by the time control information, to start decoding the coded data per unit and start outputting decoded data per unit at a time suitable to the slower speed on the basis of the time control information, a storage part temporarily holding the decoded data output from the decode part and an output control part outputting contents for one unit from the decoded data held in the storage part in a cycle suitable to the original speed on the basis of the time control information.

The reproducing unit according to the ninth aspect comprises the decoder according to the present invention and the reproduced signal processing circuit, whereby coded data recorded in the recording medium can be reproduced at an arbitrary speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing a reproducing unit according to an embodiment 2 of the present invention;

FIGS. 8 and 9 are explanatory diagrams illustrating the operations of the reproducing unit shown in FIG. 6 in the form of tables;

FIGS. 10A to 10D illustrate operations of the reproducing unit shown in FIG. 6;

FIGS. 14A to 14E illustrate operations of the reproducing unit shown in FIG. 13.

DESCRIPTION OF THE PREFERRED EMBODIMENTS

Devices according to the following embodiments are a decoder receiving MPEG data (the MPEG data most broadly includes a plurality of channels of image data, a plurality of channels of sound data and other data in the case of MPEG2-TS) coded (coding includes both of compression and multiplication in the case of MPEG2-TS) in the well-known form of the MPEG2-TS (transport stream) standards and decoding the same and a reproducing unit having this decoder, and the decoder is structured to be capable of decoding MPEG data input at a speed slower than an original speed in particular. The reproducing unit having the aforementioned decoder is capable of reproducing a recording tape recording the MPEG data at a speed slower than that in recording, to thereby be capable of decoding MPEG data read at a speed slower than an original speed.

The MPEG2-TS standards are well known to those skilled in the art, and hence various types of terms such as PCR, PTS and DTS forming time control information on the basis of the standards are only briefly described and detailed description thereof is omitted. While each embodiment is described with reference to MPEG data based on the MPEG2-TS standards, the apparatuses according to the present invention are applicable to wide-ranging coded data such as coded data having information defining a time related to decoding equivalent to time control information of the MPEG2-TS standards.

Embodiment 1.

Figure 1:
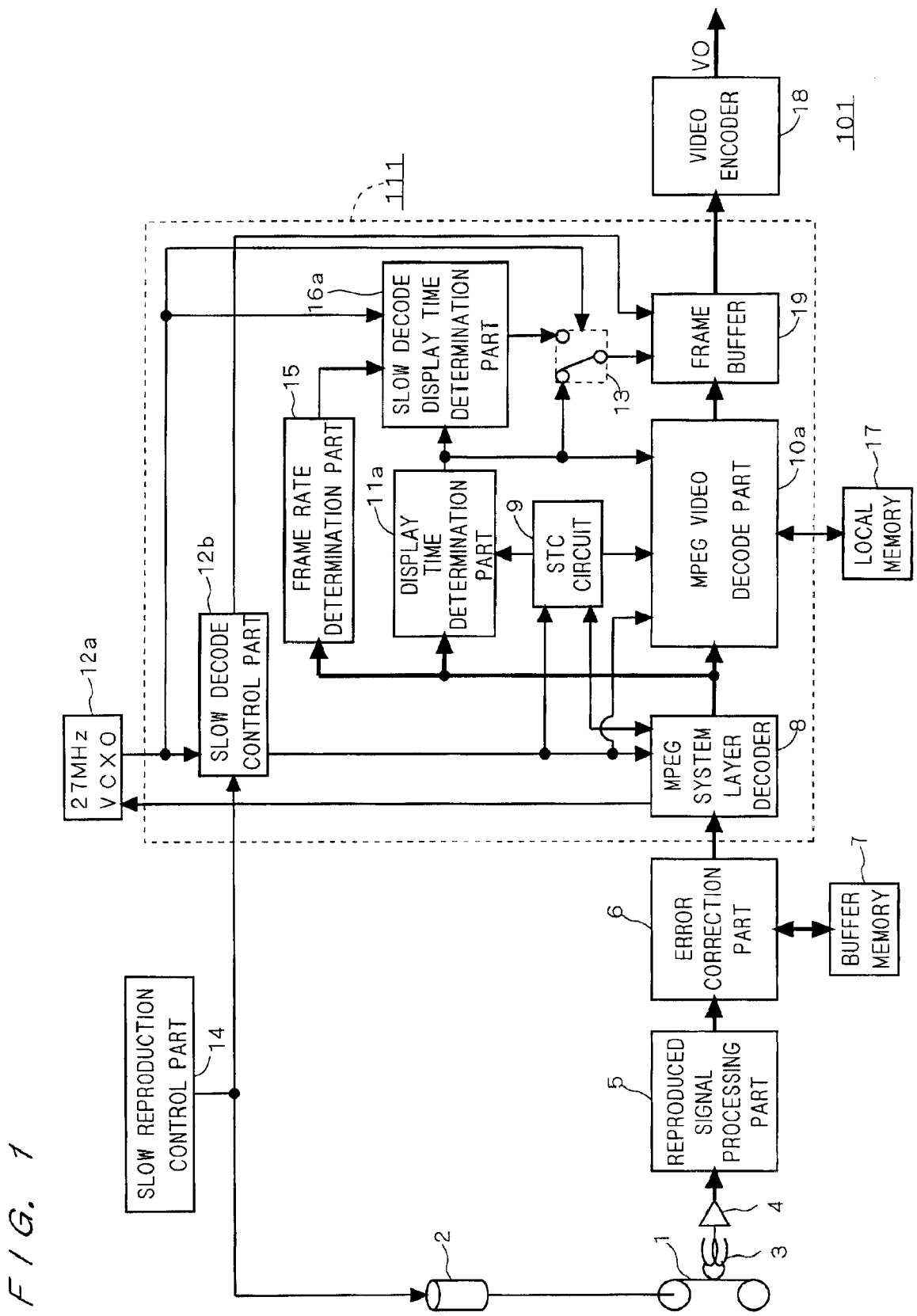
FIG. 1 is a block diagram showing a reproducing unit according to an embodiment 1 of the present invention.
Figure 13:
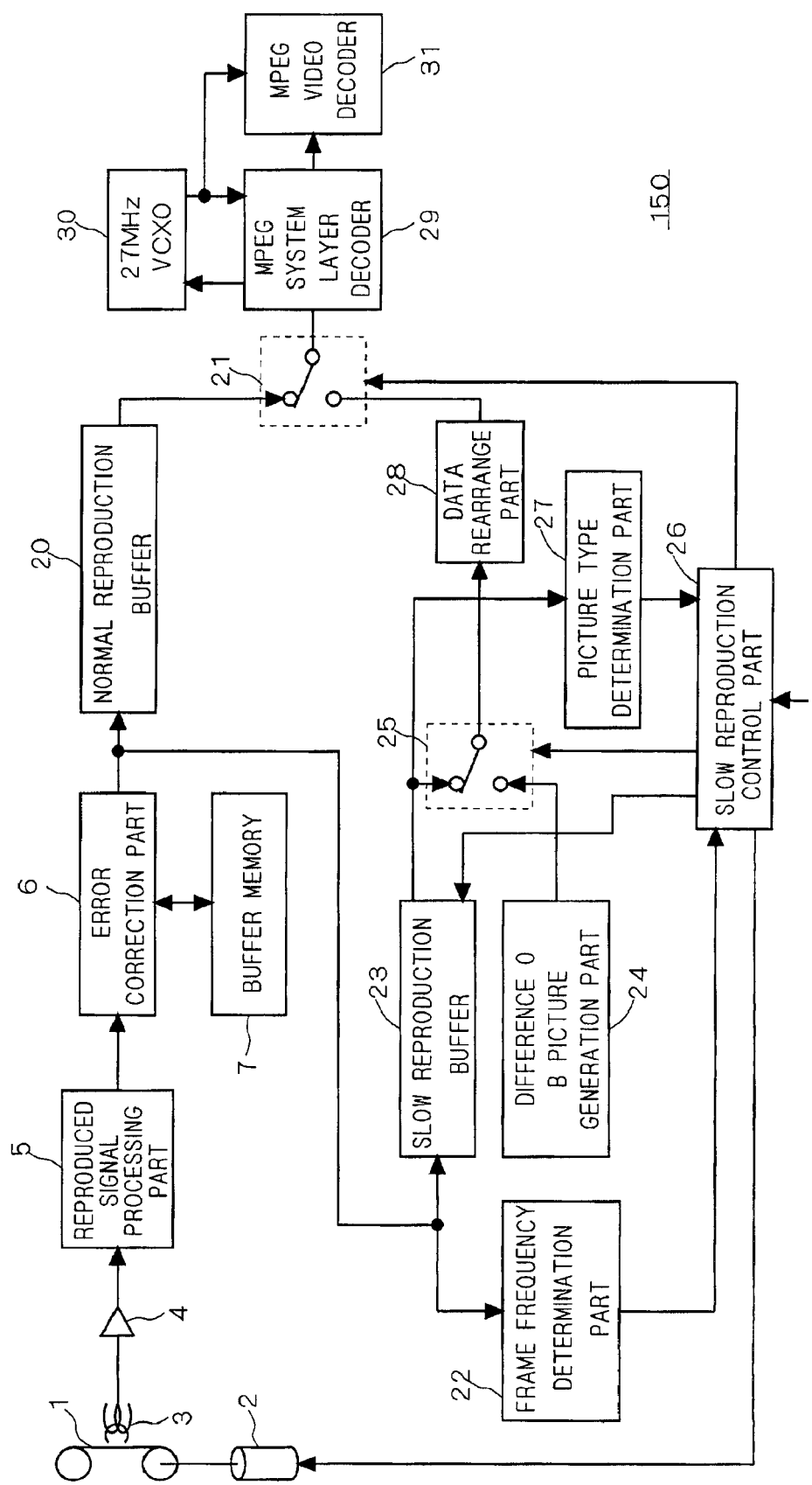
FIG. 13 is a block diagram showing a conventional reproducing unit.

FIG. 1 is a block diagram of an MPEG data reproducing unit 101 according to an embodiment 1 of the present invention. In the following figures, parts identical or corresponding to (having the same functions as) those of the prior art shown in FIG. 13 are denoted by the same reference numerals, to omit redundant description. Referring to FIG. 1, parts of signal lines transmitting signals included in MPEG data are drawn with thick lines.

The MPEG data reproducing unit 101 shown in FIG. 1 comprises an MPEG decoder 111, which receives reproduced/decoded MPEG data from an error correction part 6. In the MPEG decoder 111, an MPEG system layer decoder 8 performs system layer (MPEG-TS) decoding on the reproduced/decoded MPEG data transmitted from the error correction part 6. An STC (system time counter) circuit 9 counts a decode/output (display) timing by a PCR (program clock reference) forming the base for a timing for decoding and outputting (displaying) MPEG image/sound data. The PCR is a kind of time control information.

An MPEG video decode part 10a decodes the input MPEG image data and outputs decoded image data. A display time determination part 11a reads a PTS (presentation time stamp) indicating a timing for outputting (displaying) the decoded data from the MPEG image data, compares the PTS with a count of the STC circuit 9 performing counting on the basis of the aforementioned PCR, and supplies a control signal for starting outputting (displaying) the decoded data to the MPEG video decode part 10a and a slow decode display time determination part 16a when the count of the STC circuit 9 reaches a predetermined approximate value with respect to the PTS. The PTS is a kind of time control information.

A VCXO 12a connected with the MPEG decoder 111 generates a reference clock of 27 MHz forming a basic time unit for decoding or the like in the MPEG decoder 111 under control of the MPEG decoder 111. A slow decode control part 12b obtains a system clock by dividing the clock of 27 MHz in response to a reproducing speed and supplies the same to the MPEG system layer decoder 8 and the STC circuit 9 while controlling a switch 13 for switching a display instruction signal between general decoding (i.e., decoding at a normal speed) and slow decoding (i.e., decoding at a slow speed) and outputting the same to a frame buffer 19.

The switch 13 switchably selects the control signal output from the display time determination part 11a and a slow decode control signal separately generated in the slow decode display time determination part 16a in slow decoding. A slow reproduction control part 14 connected with the MPEG decoder 111 controls a motor drive 2, a dividing ratio selection part 12b and the switch 13 in order to attain data reproduction at a speed instructed through a user interface (not shown) or the like.

A frame rate determination part 15 reads frame frequency information, expressing a frame frequency in display, present in the MPEG image data and outputs the same to the slow decode display time determination part 16a. Throughout the specification, it is assumed that the frame frequency information is a kind of time control information. The slow decode display time determination part 16a generates a display control signal in slow reproduction on the basis of the display control signal from the display time determination part 11a, the frame frequency information from the frame rate determination part 15 and the reference clock from the VCXO 12a.

A local memory 17 connected with the MPEG decoder 111 is a storage medium expanding image data when the MPEG video decode part 10a executes decoding. A video encoder 18 connected with the MPEG decoder 111 converts a digital video signal of decoded digital image data to an analog video signal VO of analog image data. A frame buffer 19 temporarily holds one frame of the digital video signal output from the MPEG video decode part 10a.

Operations of the MPEG decoder 111 are now described with reference to FIG. 1. A signal recorded in a tape 1 is read from a reproducing head 3, amplified in a reproducing amplifier 4, subjected to signal processing such as demodulation, detection of synchronizing signal and data separation in a reproduced signal processing part 5, and thereafter input in an error correction part 6. The error correction part 6 temporarily stores the input generated data in a buffer memory 7. The error correction part 6 performs error correction when all single-unit data to which error correction codes are assigned in recording are available. Thus, errors in reproduction can be substantially completely corrected.

The error-corrected signal output from the error correction part 6 is a data stream of the MPEG-TS (TS: transport stream) system, in which image data (video data) compressed on the basis of the MPEG standards, sound data (audio data) and additional information related thereto are time-division multiplexed in a packeted form. The MPEG-TS data stream is input in the MPEG system layer decoder 8 so that a video PES (packetized elementary stream) obtained by selecting only the packet of the image data and the PCR are extracted. The video PES, a coded stream of the image according to the MPEG standards, includes a DST (decode time stamp) indicating a decode time per picture and a PTS (presentation time stamp) indicating a display time per picture. The DTS is also a kind of time control information. The PCR is information for calibrating the count of the STC circuit forming a reference time when coding/decoding images/sounds in the MPEG data reproducing unit 101. The MPEG system layer decoder 8 transmits the video PES to the MPEG video decode part 10a, the display time determination part 11a and the frame rate determination part 15 while transmitting the PCR to the STC circuit 9.

The PCR is a time interval suitable to a data rate originally set when an MPEG-TS data stream is encoded and supplied as change of a count with a reference clock of 27 MHz. Therefore, the MPEG system layer decoder 8 reads the PCR from the input MPEG-TS data stream, reads the current count from the STC circuit 9 and outputs the control signal to the VCXO 12a on the basis of the difference between the read count and the value of the PCR, thereby reproducing a system time superposed on the data stream and enabling decoding. The VCXO 12a increases or decreases an oscillation frequency on the basis of the input control signal thereby making adjustment for obtaining a clock frequency suitable to the PCR in the data stream. When the read current STC (i.e., the count of the STC circuit 9) leads the time indicated by the read PCR, the VCXO 12a makes adjustment to reduce the oscillation frequency. When the time indicated by the STC lags the time indicated by the PCR, the VCXO 12a makes adjustment to increase the oscillation frequency.

In slow reproduction, the slow reproduction control part 14 controls the motor drive 2 to suit to slow reproduction on the basis of reproducing speed information (i.e., information expressing the reproducing speed) specified through the user interface (not shown) or the like and controls the slow decode control part 12b to divide a clock signal output from the VCXO 12a at a dividing ratio suitable to the reproducing speed and controls the switch 13 to switch to a display time suitable to the reproducing speed. The slow decode control part 12b divides the input clock signal on the basis of the reproducing speed information input from the slow reproduction control part 14. For example, the slow decode control part 12b outputs the input clock signal as such (1/1 time) when performing reproduction at a normal speed, while dividing the input clock signal into N and converting the frequency to 1/N times for outputting the same when performing 1/N speed slow reproduction.

The motor drive 2 changes the traveling speed of the tape 1 on the basis of the control signal from the slow reproduction control part 14. In 1/N speed slow reproduction, the traveling speed of the tape 1 is 1/N times that in normal reproduction. In 1/N speed slow reproduction, therefore, the data rate of the signal read from the reproducing head 3 is also 1/N times that in normal reproduction, and the signal processed through the reproducing amplifier 4, the reproduced signal processing part 5 and the error processing part 6 is input in the MPEG system layer decoder 8 at a data rate 1/N times that in normal reproduction.

The STC circuit 9 performs counting on the basis of the clock signal input from the slow decode control part 12b. In 1/N speed slow reproduction, therefore, counting is performed on the basis of a signal divided into a frequency 1/N times that of the clock signal output from the VCXO 12a. In this case, the speed of the data stream arriving at the MPEG system layer decoder 8 is 1/N times and hence no conflict of the change speed takes place between the PCR read from the data stream and the count of the STC circuit 9 based on the system clock divided into 1/N times but the control signal of the VCXO 12a based on the difference therebetween is correctly generated.

The display time determination part 11a extracts the PTS indicating the display timing from the video PES input from the MPEG system layer decoder 8. The display time determination part 11a further monitors the STC circuit 9 and outputs a display start instruction for making the frame buffer 19 start displaying a corresponding image to the switch 13 when the time indicated by the PTS and the time indicated by the STC circuit 9 match with each other or reach a certain vicinity range.

The frame rate determination part 15 extracts frame rate information indicating the frame period of the image from the video PES input from the MPEG system layer decoder 8 and outputs the frame rate information to the slow decode display time determination part 16a. The slow decode display time determination part 16a obtains the frame period of the image from the frame rate information input from the frame rate determination part 15. The slow decode display time determination part 16*a* regards the time of arrival of the display start instruction for a first frame to be decoded input from the display time determination part 11*a* as a starting point and outputs the display start instruction to the switch 13 every frame period. The reference clock signal input from the VCXO 12*a* is used for generating the frame period. The slow decode display time determination part 16*a* has a counter (not shown) counting the reference clock signal and obtains the frame period by comparing the count thereof with the frame rate information.

The slow reproduction control part 14 controls the switch 13 so that the display start instruction output from the display time determination part 11*a* is input in the frame buffer 19 in normal reproduction while controlling the switch 13 so that the display start instruction output from the slow decode display time determination part 16*a* is input in the frame buffer 19 in slow reproduction.

Figure 2:
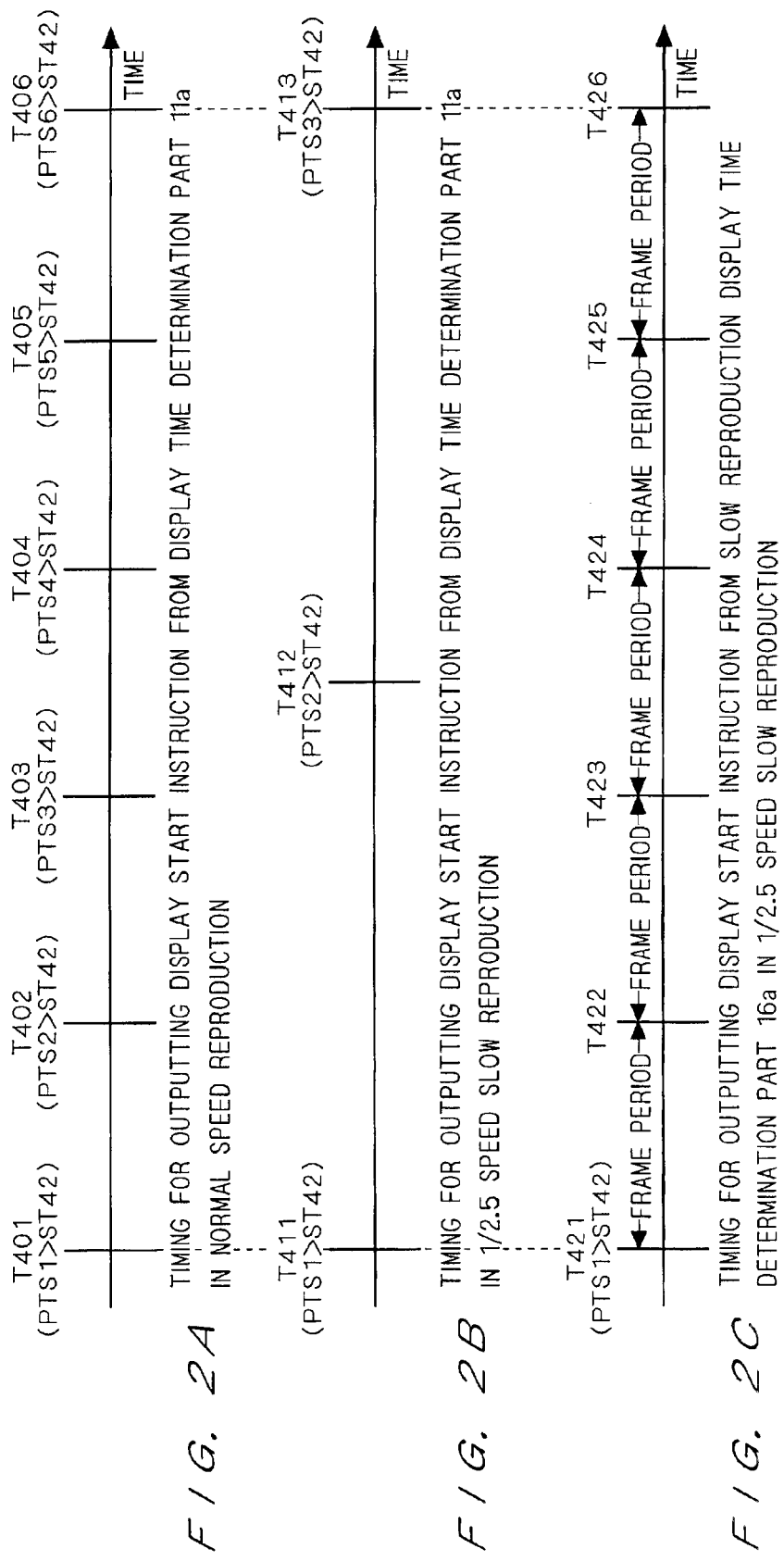
FIGS. 2A to 2C and 3A to 3F illustrate operations of the reproducing unit shown in FIG. 1.

FIGS. 2A to 2C illustrate timing charts showing timings for inputting the display start instructions output from the display time determination part 11*a* and the slow decode display time determination part 16*a* in the frame buffer 19 through the switch 13. The timing chart of FIG. 2A shows a timing for inputting the display start instruction in the frame buffer 19 in normal reproduction, the timing chart of FIG. 2B shows a timing for outputting the display start instruction from the display time determination part 11*a* in 1/2.5 speed reproduction as exemplary slow decoding, and the timing chart of FIG. 2C shows a timing for outputting the display start instruction from the slow decode display time determination part 16*a* in 1/2.5 speed reproduction. FIGS. 2A to 2C display these three timings to be comparable with each other.

In normal reproduction, the slow reproduction control part 14 so controls the switch 13 that the display start instruction output from the display time determination part 11*a* is input in the frame buffer 19 through the switch 13. In the timing chart of FIG. 2A, the display time determination part 11*a* detects that PTS 1, which is the PTS of an image displayed first, matches with the count (ST42) of the STC circuit 9 at a time T401, and the display start instruction is output to the switch 13 and input in the frame buffer 19 through the switch 13 at this time. Similarly, the display time determination part 11*a* detects that PTS2, which is the PTS of an image displayed next, matches with the count of the STC circuit 9 at a time T402 in the timing chart of FIG. 2A, and the display start instruction is output to the switch 13 and input in the frame buffer 19 through the switch 13 at this time. Thus, the display start instruction is input in the frame buffer 19 at the time when the PTS extracted from the video PES and the count of the STC circuit 9 match with each other in normal reproduction.

The timing for outputting the display start instruction from the display time determination part 11*a* in slow reproduction is now described. The timing chart of FIG. 2B shows the timing for outputting the display start instruction from the display time determination part 11*a* in 1/2.5 speed slow reproduction as exemplary slow reproduction at a speed not corresponding to a fraction of an integer. Referring to the timing chart of FIG. 2B, the display time determination part 11*a* detects that PTS1 which is the PTS of the image displayed first and the count of the STC circuit 9 match with each other at a time T411, and detects that the PTS2 which is the PTS of the image displayed next and the count of the STC circuit 9 match with each other at a time T412. In 1/2.5 speed reproduction, the frequency of the clock signal input in the STC circuit 9 is reduced to 1/2.5 times that in normal reproduction. As compared with the interval between the times T401 and T402 in normal reproduction, therefore, the interval between the times the T411 and T412 in 1/2.5 speed slow reproduction enlarges to 2.5 times.

Also in slow reproduction, the MPEG video decode part 10*a* must output the image data in a proper frame period so that the image data output from the MPEG data reproducing unit 101 is correctly displayed on an external monitor. The proper frame period is obtained from the frame rate determination part 15.

The slow decode display time determination part 16*a* outputs the display start instruction every frame period with reference to a time (T421) when the display start instruction is first input from the display time determination part 11*a*. In slow reproduction, the slow reproduction control part 14 inputs reproducing speed information expressing the speed at which the MPEG data is input in the MPEG system layer decoder 8 in the slow decode control part 12*b*. On the basis of the input reproducing speed information, the slow decode control part 12*b* divides the 27 MHz clock signal input from the VCXO 12*a* in response to the input speed and outputs the divided signal to the MPEG system layer decoder 8 and controls the switch 13 so that the display start instruction output from the slow decode display time determination part 16*a* is input in the frame buffer 19. In this case, the slow decode display time determination part 16*a* reproduces the frame frequency not on the basis of the clock divided by the slow decode control part 12*b* but on the basis of the undivided 27 MHz clock signal, whereby the display start instruction is input in the frame buffer 19 in the proper frame period also in slow reproduction at a speed not corresponding to a fraction of an integer.

The timing chart of FIG. 2C shows the timing for outputting the display start instruction from the slow decode display time determination part 16*a* in 1/2.5 speed reproduction. The slow decode display time determination part 16*a* outputs the display start instruction at times T421, T422, T423, T424, T425 an T426. The slow decode display time determination part 16*a* first receives the display start instruction from the display time determination part 11 at the time T421. The time T422 is after a lapse of the frame period from the time T421, the time T423 is after a lapse of the frame period from the time T421, and the time T423 is after a lapse of the frame period from the time T4. The slow decode display time determination part 16*a* outputs the display start instruction every frame period at the times T422, T423, . . . with reference to the time T421. The frame period is generated on the basis of the undivided 27 MHz clock signal from the VCXO 12*a* regardless of the slow reproducing speed.

The MPEG video decode part 10*a* extracts a DTS of each image from the video PES input from the MPEG system layer decoder 8. The MPEG video decode part 10*a* reads the count of the STC circuit 9 and starts decoding the corresponding image when the time indicated by the count of the STC circuit 9 matches with the time indicated by the DTS extracted from the video PES. The clock signal obtained by dividing the 27 MHz clock signal output from the VCXO 12*a* in the slow decode control part 12*b* according to the reproducing speed is input in the MPEG video decode part 10*a*, which in turn performs decoding in synchronization with the input clock signal. The MPEG video decode part 10*a* stores the decoded image data in a local memory 17. When the display start instruction is input from the display time determination part 11*a*, the MPEG video decode part 10*a* reads the image data from the local memory 17 and outputs the image data to the frame buffer 19.

The frame buffer 19 stores the image data input from the MPEG video decode part 10a and starts outputting the stored image data to a video encoder 18 every time the display start instruction is input from the switch 13.

Figure 3:
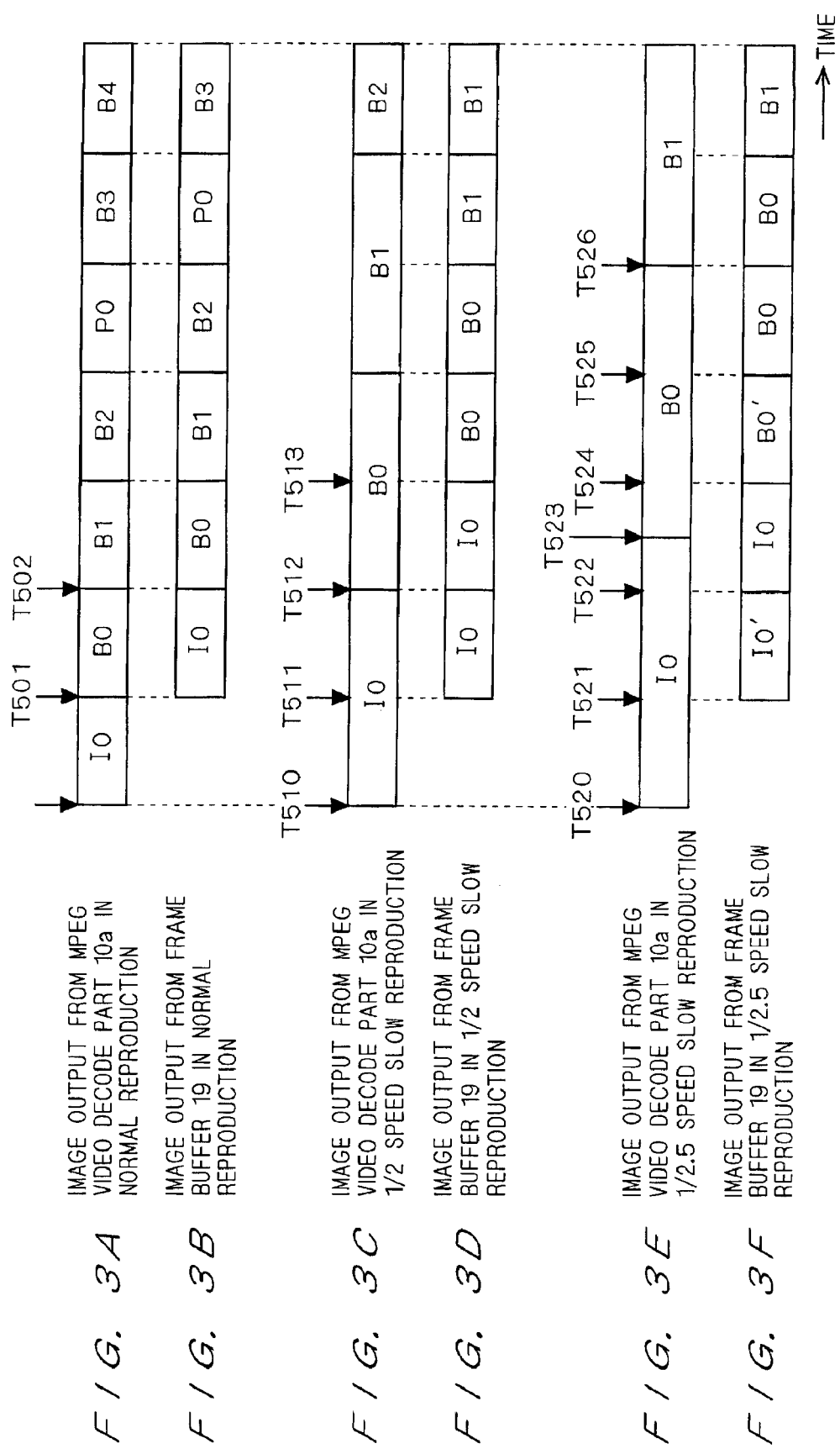

FIGS. 3A to 3F are timing charts showing timings of various output image data in comparison with each other. An image shown in FIG. 3A is exemplary image data output from the MPEG video decode part 10a to the frame buffer 19 in normal reproduction. The MPEG video decode part 10a outputs image data to the frame buffer 19 in order of pictures I0, B0, B1, B2, P0, . . . .

An image shown in FIG. 3A is image data output from the frame buffer 19 to the video encoder 18 when the frame buffer 19 receives the image data expressed in FIG. 3A. When the display start instruction is input in the MPEG video decode part 10a at a time T500, the MPEG video decode part 10a starts outputting the image data of the decoded picture I0, so that the frame buffer 19 stores the image data of the picture I0. At a time T501 when the display start instruction is input in the MPEG video decode part 10a next, the MPEG video decode part 10a starts outputting the image data of the decoded picture B0 and the frame buffer 19 starts outputting the stored image data of the picture I0 to the video encoder 18. Thus, the frame buffer 19 starts outputting the image data to the video encoder 18 in a delay by the frame period from the time when the MPEG video decode part 10 starts outputting.

An image of FIG. 3C shows exemplary image data output from the MPEG video decode part 10a to the frame buffer 19 in 1/2 speed slow reproduction as exemplary slow reproduction at an integer-fractional speed. While the MPEG video decode part 10a outputs image data in order of pictures I0, B0, B1, B2, P0, . . . , the clock signal input in the MPEG video decode part 10a has a frequency half that in normal reproduction and hence the time required for the MPEG video decode part 10a to output the image data is twice that in normal reproduction.

An image of FIG. 3D shows image data output from the frame buffer 19 to the video encoder 18 when the image data expressed in the image of FIG. 3C is input in the frame buffer 19. In 1/2 speed slow reproduction, the slow decode display time determination part 16a outputs the display start instruction to the switch 3 every frame period and the display start instruction is input in the frame buffer 19 through the switch 13. When the display start instruction is input in the MPEG video decode part 10a at a time T510, the MPEG video decode part 10a starts outputting the image data of the decoded picture I0 and the frame buffer 19 stores the image data of the picture I0. At a time T511 after a lapse of the frame period from the time T510, the display start instruction is input in the frame buffer 19, which in turn starts outputting the image data of the picture I0 to the video encoder 18. At a time T512 when the display start instruction is input in the video decode part 10a next, the MPEG video decode part 10a starts outputting the image data of the picture B0 to the frame buffer 19, which in turn starts outputting the image data of the picture I0 to the video encoder 18 again. At a time T513, the display start instruction is input in the frame buffer 19, which in turn starts outputting the image data of the picture B0 to the video encoder 18.

An image of FIG. 3E shows exemplary image data output from the MPEG video decode part 10a to the frame buffer 19 in 1/2.5 speed slow reproduction as exemplary slow reproduction at a speed not corresponding to a fraction of an integer. While the MPEG video decode part 10a outputs image data in order of pictures I0, B0, B1, B2, P0, . . . to the frame buffer 19, the clock signal input in the MPEG video decode part 10a is at a frequency 1/2.5 times that in normal reproduction and hence the time required for the MPEG video decoding pat 10a to output the image data is 2.5 times that in normal reproduction.

An image of FIG. 3F shows image data output from the frame buffer 19 to the video encoder 18 when the frame buffer 19 receives the image data expressed in FIG. 3E. In 1/2.5 speed slow reproduction, the slow decode display time determination part 16a outputs the display start instruction to the switch 13 every frame period and the display start instruction is input in the frame buffer 19 through the switch 13.

When the display start instruction is input in the MPEG video decode part 10a at a time T520, the MPEG video decode part 10a starts outputting the image data of the decoded picture I0 and the frame buffer 19 stores the image data of the picture I0. At a time T521 after a lapse of the frame period from the time 520 and a time T522 after a lapse of the frame period from the time T521, the display start instruction is input in the frame buffer 19, which in turn starts outputting the stored image data to the video encoder 18.

At a time T523 when the display start instruction is input in the MPEG video decode part 10a next, the MPEG video decode part 10a starts outputting the image data of the picture B0 to the frame buffer 19. At a time T524 after a lapse of the frame period from the time 522 and a time T525 after a lapse of the frame period from the time T524, the display start instruction is input in the frame buffer 19, which in turn starts outputting the stored image data to the video encoder 18.

The MPEG video decode part 10a starts outputting the image data of the picture I0 from the time T520 and completes this output before the time T523, while the frame buffer 19 completes outputting image data of a picture I0' before the time T522 preceding the time T523. Before reading the image data from the frame buffer 19 for outputting the image data of the picture I0', therefore, the MPEG video decode part 10a outputs only part of the image data of the picture I0 written in the frame buffer 19 as the image data of the picture I0'. Therefore, the image data of the picture I0' is identical to the image data of the picture I0 only on an upper portion in the screen.

Similarly, the MPEG video decode part 10a starts outputting the image data of the picture B0 from the time T523 and completes this output before a time T526, while the frame buffer 19 completes outputting image data of a picture B0' before the time T525 preceding the time T526. Before reading the image data from the frame buffer 19 for outputting the image data of the picture B0', therefore, the MPEG video decode part 10a outputs part of the image data of the picture B0' written in the frame buffer 19 and part of the image data of the picture I0 not yet overwritten by writing of the image data of the picture B0 by the MPEG video decode part 10a as the image data of the picture B0'. Therefore, the image data of the picture B0' is identical to the image data of the picture B0 only on an upper portion in the screen and identical to the image data of the picture I0 on a lower portion.

As hereinabove described, the frame buffer 19 starts outputting the image data stored therein to the video encoder 18 in a delay by the frame period from the time when the MPEG video decode part 10a starts outputting first in slow reproduction. The video encoder 18 converts the image data, which is a digital video signal output from the frame buffer 19, to an NTSC video signal displayable on a commercially available TV monitor. The frame buffer 19 inputs image data in the video encoder 18 every proper frame period both in normal reproduction and in slow reproduction, whereby the video encoder 18 can convert the input image data to a proper NTSC video signal and output the converted NTSC video signal.

Embodiment 2.

FIG. 4 is a block diagram of an MPEG data reproducing unit 102 including an MPEG decoder according to an embodiment 2 of the present invention. The MPEG data reproducing unit 102 shown in FIG. 4 comprises an MPEG decoder 112, and is characteristically different from the MPEG data reproducing unit 101 shown in FIG. 1 in relation to part of a signal line transmitting an input signal to an MPEG video decode part 10a.

In the MPEG data reproducing unit 102, the MPEG video decode part 10a extracts a DTS of each image from a video PES input from an MPEG system layer decoder 8. The MPEG video decode part 10a reads a count of an STC circuit 9 and starts decoding a corresponding image when a time indicated by the count of the STC circuit 9 matches with a time indicated by the DTS extracted from the video PES. In the MPEG data reproducing unit 102, the MPEG video decode part 10a performs decoding in synchronization with a 27 MHz clock signal input from a VCXO 12a. The MPEG video decode part 10a stores the decoded image data in a local memory 17. When a display start instruction is input from a switch 13, the MPEG video decode part 10a reads the image data from the local memory 17 and outputs the read image data to a frame buffer 19. The frame buffer 19 stores the image data input from the MPEG video decode part 10a and starts outputting the stored image data to a video encoder 18 every time the display start instruction is input from the switch 13.

Figure 5:
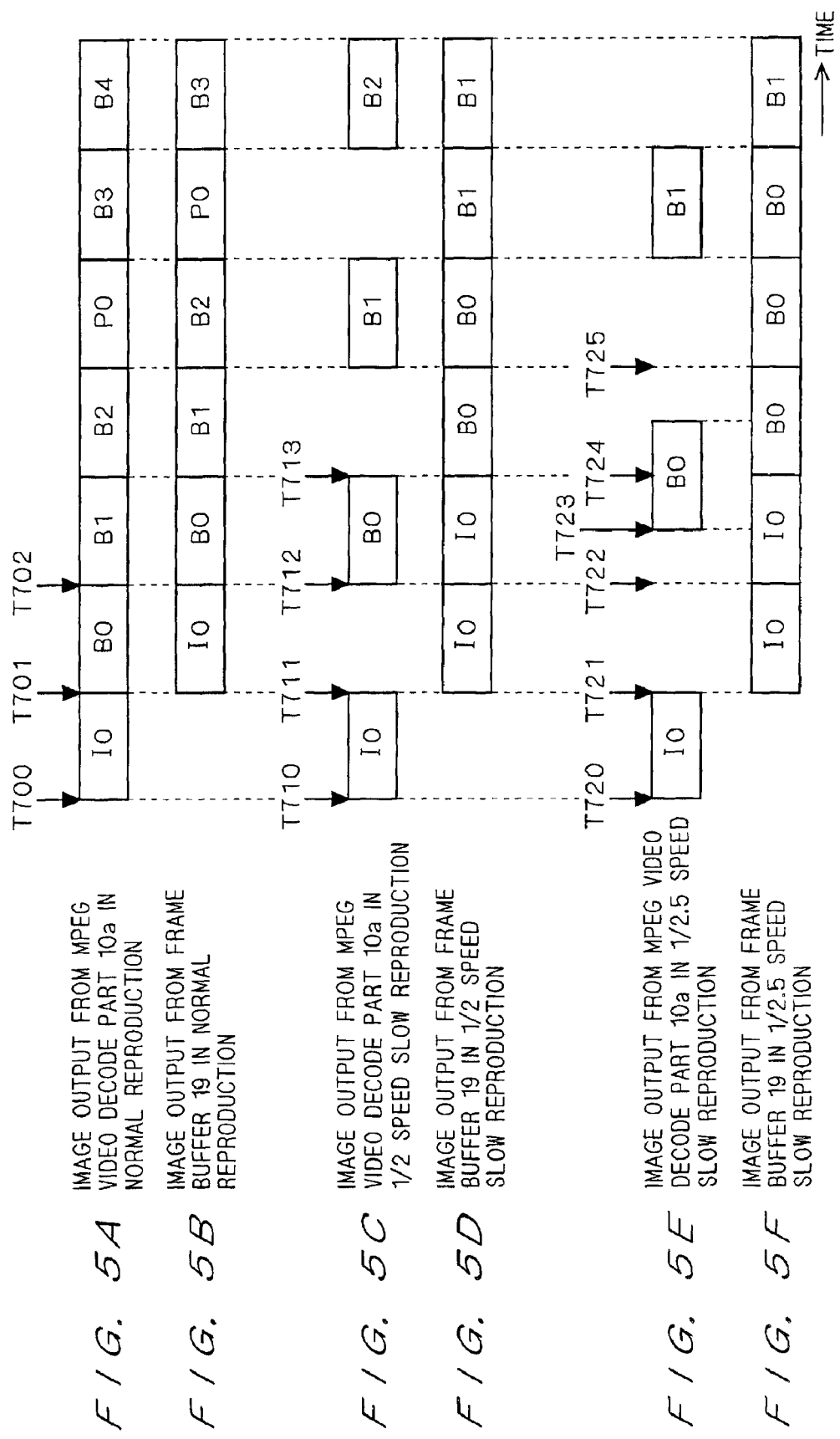
FIGS. 5A to 5F illustrate operations of the reproducing unit shown in FIG. 4.

FIGS. 5A to 5F are timing charts showing timings of various output image data in comparison with each other. An image of FIG. 5A shows exemplary image data output from the MPEG video decode part 10a to the frame buffer 19 in normal reproduction. The MPEG video decode part 10a outputs image data to the frame buffer 19 in order of pictures I0, B0, B1, B2, P0, . . . .

An image of FIG. 5B shows exemplary image data output from the frame buffer 19 to the video encoder 18 when the frame buffer 19 receives the image data expressed in the image of FIG. 5A. When the display start instruction is input in the MPEG video decode part 10a at a time T700, the MPEG video decode part 10a starts outputting the image data of the decoded picture I0 and the frame buffer 19 stores the image data of the picture I0. At a time T701 when the display start instruction is input in the MPEG video decode part 10a next, the MPEG video decode part 10a starts outputting the image data of the decoded picture B0 to the frame buffer 19, which in turn starts outputting the stored image data of the picture I0 to the video encoder 18. Thus, the frame buffer 19 starts outputting the image data to the video encoder 18 in a delay by a frame period from the time when the MPEG video decode part 10a starts outputting in normal reproduction.

An image of FIG. 5C shows exemplary image data output from the MPEG video decode part 10a to the frame buffer 19 in 1/2 speed slow reproduction as exemplary slow reproduction at an integer-fractional speed. The MPEG video decode part 10a outputs image data in order of pictures I0, B0, B1, B2, P0, . . . . A clock signal input in the MPEG video decode part 10a has a frequency identical to that in normal reproduction and hence the time required for the MPEG video decode part 10a to output the image data is identical to that in normal reproduction.

An image of FIG. 5D shows image data output from the frame buffer 19 to the video encoder 18 when the frame buffer 19 receives the image data expressed in FIG. 5C. In 1/2 speed slow reproduction, a slow decode display time determination part 16a outputs the display start instruction to the switch 13 every frame period and the display start instruction is input in the frame buffer 19 through the switch 13. When the display start instruction is input in the MPEG video decode part 10a at a time T710, the MPEG video decode part 10a starts outputting the image data of the decoded picture I0 and the frame buffer 19 stores the image data of the picture I0. At a time T711 after a lapse of the frame period from the time T710, the display start instruction is input in the frame buffer 19, which in turn starts outputting the image data of the picture I0 to the video encoder 18. At a time T712 when the display start instruction is input in the video decode part 10a next, the MPEG video decode part 10a starts outputting the image data of the picture B0 to the frame buffer 19, which in turn starts outputting the image data of the picture I0 to the video encoder 18 again. At a time T713, the display start instruction is input in the frame buffer 19, which in turn starts outputting the image data of the picture B0 to the video encoder 18.

An image of FIG. 5E shows exemplary image data output from the MPEG video decode part 10a to the frame buffer 19 in 1/2.5 speed slow reproduction as exemplary slow reproduction at a speed not corresponding to a fraction of an integer. The MPEG video decode part 10a outputs image data in order of pictures I0, B0, B1, B2, P0, . . . to the frame buffer 19. The frequency of the clock signal input in the MPEG video decode part 10a is identical to that in normal reproduction and hence the time required for the MPEG video decoding pat 10a to output the image data is identical to that in normal reproduction.

An image of FIG. 5F shows image data output from the frame buffer 19 to the video encoder 18 when the frame buffer 19 receives the image data expressed in FIG. 5E. In 1/2.5 speed slow reproduction, the slow decode display time determination part 16a outputs the display start instruction to the switch 13 every frame period and the display start instruction is input in the frame buffer 19 through the switch 13. When the display start instruction is input in the MPEG video decode part 10a at a time T720, the MPEG video decode part 10a starts outputting the image data of the decoded picture I0 and the frame buffer 19 stores the image data of the picture I0. At a time T721 after a lapse of the frame period from the time T720 and a time T722 after a lapse of the frame period from the time T721, the display start instruction is input in the frame buffer 19, which in turn starts outputting the stored image data to the video encoder 18. At a time T723 when the display start instruction is input in the MPEG video decode part 10a next, the MPEG video decode part 10a starts outputting the image data of the picture B0. At a time T724 after a lapse of the frame period from the time T722 and a time T725 after a lapse of the frame period from the time T724, the display start instruction is input in the frame buffer 19, which in turn starts outputting the stored image data to the video encoder 18.

As hereinabove described, the frame buffer 19 starts outputting the image data stored therein to the video encoder 18 in a delay by the frame period from the time when the MPEG video decode part 10a starts outputting first in slow reproduction. The video encoder 18 converts the image data, which is a digital video signal input from the frame buffer 19, to an NTSC video signal. The frame buffer 19 inputs image data in the video encoder 18 every proper frame period both in normal reproduction and in slow reproduction, whereby the video encoder 18 can convert the input image data to a proper NTSC video signal and output the converted NTSC video signal.

Embodiment 3.

Figure 6:
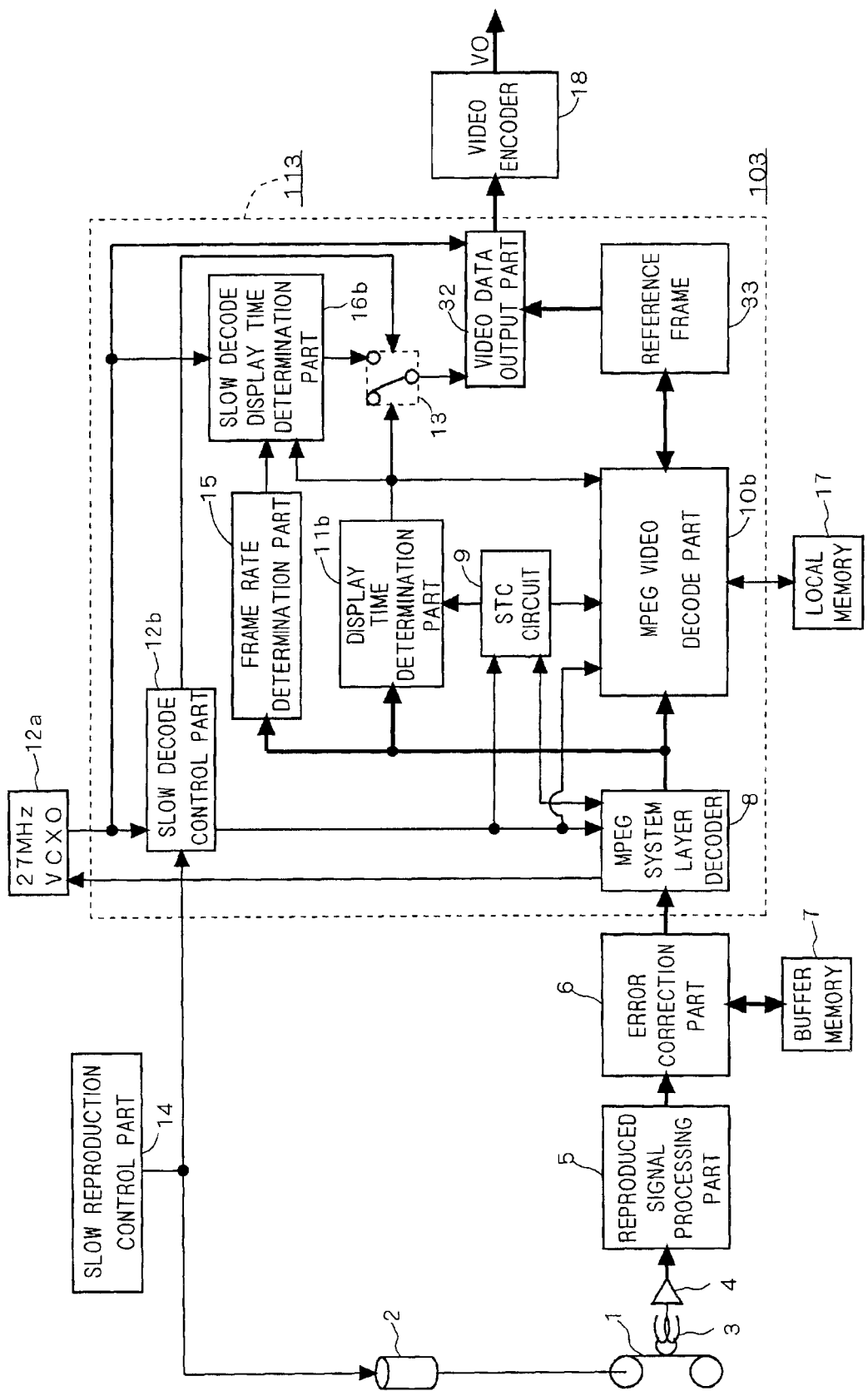
FIG. 6 is a block diagram showing a reproducing unit according to an embodiment 3 of the present invention.

FIG. 6 is a block diagram of an MPEG data reproducing unit 103 including an MPEG decoder according to an embodiment 3 of the present invention. The MPEG data reproducing unit 103 shown in FIG. 6 comprises an MPEG decoder 113, and is characteristically different from the MPEG data reproducing unit 101 shown in FIG. 1 in that the same comprises an MPEG video decode part 10b in place of the MPEG video decode part 10a, a display time determination part 11b in place of the display time determination part 11a and a slow decode display time determination part 16b in place of the slow decode display time determination part 16a as well as an image data output part 32 and a reference frame 33.

The display time determination part 11b reads a PTS (presentation time stamp) indicating a data output (display) timing after decoding from MPEG image data, compares the PTS with a count of an STC circuit 9 performing counting on the basis of a PCR and supplies a control signal for starting outputting (displaying) decoded data to the MPEG video decode part 10b and the slow decode display time determination part 16b when the count of the STC circuit 9 reaches a predetermined approximate value with respect to the PTS.

The slow decode display time determination part 16b generates a display control signal in slow reproduction on the basis of the display control signal from the display time determination part 11b, frame frequency information from a frame rate determination part 15 and a reference clock from a VCXO 12a. The MPEG video decode part 10b decodes MPEG image data. The reference frame 33 is a memory for expanding and referring to image data when the PEG video decode part 10b performs decoding. The image data output part 32 outputs the image data stored in the reference frame 33 according to the display control signals generated by the display time determination part 11b and the slow decode display time determination part 16b.

The MPEG data reproducing unit 103 having the aforementioned structure operates as follows. An error-corrected signal output from an error correction part 6 is a data stream of the MPEG-TS (TS: transport stream) system, in which image data (video data) compressed on the basis of the MPEG standards, sound data (audio data) and additional information related thereto are time-division multiplexed in a packeted form. The MPEG-TS data stream is input in an MPEG system layer decoder 8 so that a video PES obtained by selecting only the packet of the image data and the PCR are extracted. The MPEG system layer decoder 8 transmits the video PES to the MPEG video decode part 10b, the display time determination part 11b and the frame rate determination part 15 while transmitting the PCR to the STC circuit 9.

The MPEG video decode part 10b extracts a DTS of each image from the video PES input from the MPEG system layer decoder 8. The MPEG video decode part 10b reads the count of the STC circuit 9 and starts decoding a corresponding image when the time indicated by the count of the STC circuit 9 matches with a time indicated by the DTS extracted from the video PES. A clock signal obtained by dividing a 27 MHz clock signal output from the VCXO 12a in the slow decode control part 12b according to a reproducing speed is input in the MPEG video decode part 10b, which in turn performs decoding on the basis of the input clock signal. The MPEG video decode part 10b further stores the decoded image data in the reference frame 33.

The display time determination part 11b extracts a PTS indicating a display timing from the video PES input from the MPEG system layer decoder 8. The display time determination part 11b further monitors the STC circuit 9 and outputs a next image display start instruction for making the image data output part 32 start displaying the image to a switch 13 when the time indicated by the PTS and the time indicated by the STC circuit 9 match with each other or reach a certain approximate range. The next image display start instruction is an instruction for starting displaying an image, different from a precedently displayed image, to be displayed subsequently to the precedently displayed image.

The frame rate determination part 15 extracts frame rate information expressing the frame period of the image from the video PES input from the MPEG system layer decoder 8 and outputs the frame rate information to the slow decode display time determination part 16b. The slow decode display time determination part 16b can obtain the frame period of the image from the frame rate information input from the frame rate determination part 15. The slow decode display time determination part 16b regards the time of arrival of the display start instruction for a first frame input from the display time determination part 11b as a starting point, generates an iteration display start instruction every frame period and outputs the same to the switch 13. When the next image display start instruction is input from the display time determination part 11b or at a time when an iteration display start instruction subsequent thereto is output, however, the slow decode display time determination part 16b outputs the next image display start instruction in place of the iteration display start instruction. The iteration display start instruction is an instruction for starting displaying the same image as the precedently displayed image. An undivided clock signal input from the VCXO 12a is employed for generating the frame period.

A slow reproduction control part 14 controls the switch 13 so that the display start instruction output from the display time determination part 11b is input in the image data output part 32 in normal reproduction, and controls the switch 13 so that the next image display start instruction or the iteration display start instruction output from the slow decode display time determination part 16b is input in the image data output part 32 in slow reproduction.

Figure 7A:
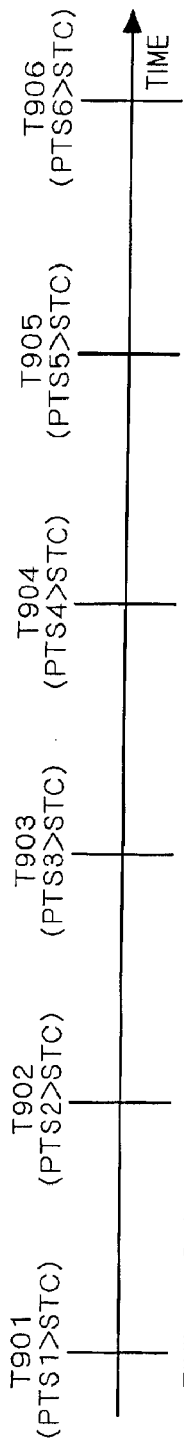
FIGS. 7A to 7C illustrate operations of the reproducing unit shown in FIG. 6.
Figure 7B:
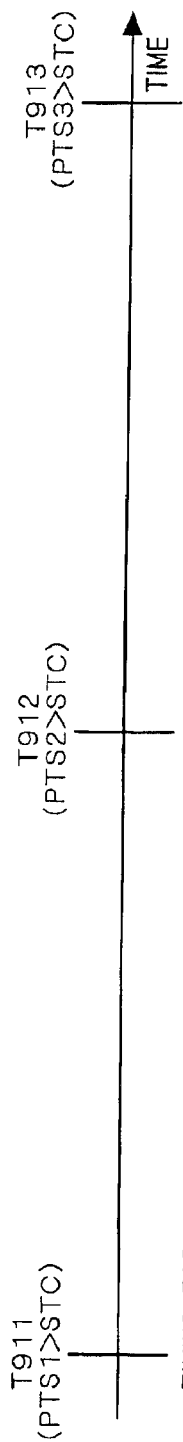
Figure 7C:
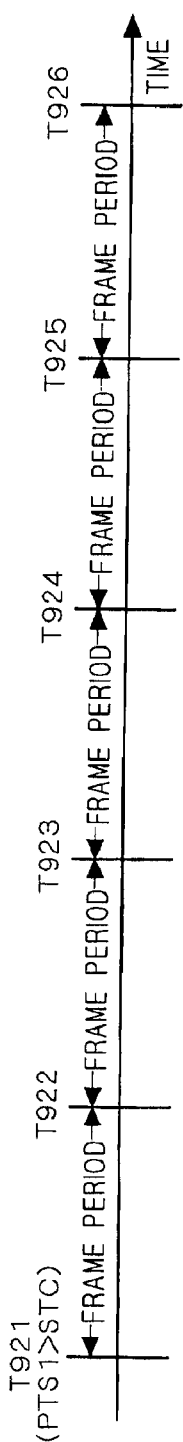

FIGS. 7A to 7C illustrate timing charts showing timings for inputting the next image display start instruction or the iteration display start instruction output from the display time determination part 11b and the slow decode display time determination part 16b in the image data output part 32 through the switch 13. The timing chart of FIG. 7A shows a timing for inputting the next image display start instruction in the image data output part 32 in normal reproduction, the timing chart of FIG. 7B shows a timing for outputting the next image display start instruction from the display time determination part 11b in 1/2.5 speed reproduction as exemplary slow decoding, and the timing chart of FIG. 7C shows a timing for outputting the next image display start instruction or the iteration display start instruction from the slow decode display time determination part 16b in 1/2.5 speed reproduction.

FIGS. 7A to 7C show these three timings to be comparable with each other. FIG. 8 shows operations at respective times shown in the timing chart of FIG. 7A in the form of a table. Similarly, FIG. 9 shows operations at respective times shown in the timing chart of FIG. 7C in the form of a table.

In normal reproduction, the slow reproduction control part 14 so controls the switch 13 that the next image display start instruction output from the display time determination part 11b is input in the image data output part 32 through the switch 13. In the timing chart of FIG. 7A, the display time determination part 11b detects that PTS1 which is the PTS of an image displayed first matches with the count of the STC circuit 9 at a time T901 and the next image display start instruction is output to the switch 13 and input in the image data output part 32 through the switch 13 at this time. Similarly, the display time determination part 11b detects that PTS2, which is the PTS of an image displayed next, matches with the count of the STC circuit 9 at a time T902 in the timing chart of FIG. 7A, and the next image display start instruction is output to the switch 13 and input in the image data output part 32 through the switch 13 at this time. Thus, the next image display start instruction is input in the image data output part 32 at the time when the PTS extracted from the video PES and the count of the STC circuit 9 match with each other in normal reproduction.

The timing for outputting the next image display instruction from the display time determination part 11b in slow reproduction is now described. The timing chart of FIG. 7B shows the timing for outputting the next image display start instruction from the display time determination part 11b in 1/2.5 speed slow reproduction as exemplary slow reproduction at a speed not corresponding to a fraction of an integer. Referring to the timing chart of FIG. 7B, the display time determination part 11b detects that PTS1, which is the PTS of the image displayed first, matches with the count of the STC circuit 9 at a time T911, and detect that PTS2, which is the PTS of the image displayed next, matches with the count of the STC circuit 9 at a time T912. In 1/2.5 speed reproduction, the frequency of the clock signal input in the STC circuit 9 is reduced to 1/2.5 times that in normal reproduction. As compared with the interval between the times T901 and T902 in normal reproduction, therefore, the interval between the times T911 and T912 in 1/2.5 speed slow reproduction enlarges to 2.5 times.

Also in slow reproduction, the image data output part 32 must output the image data in a proper frame period so that the image data output from the MPEG data reproducing unit 103 is correctly displayed on an external monitor. The proper frame period is obtained from the frame rate determination part 15.

The slow decode display time determination part 16b outputs the next image display start instruction or the iteration display start instruction every frame period with reference to a time when the display start instruction is first input from the display time determination part 11b. In slow reproduction, the slow reproduction control part 14 controls the switch 13 so that the next image display start instruction or the iteration display start instruction output from the slow decode display time determination part 16b is input in the image data output part 32. Thus, the display start instruction is input in the image data output part 32 in the proper frame period also in slow reproduction at a speed not corresponding to a fraction of an integer.

The timing chart of FIG. 7C shows the timing for outputting the next image display start instruction or the iteration display start instruction from the slow decode display time determination part 16b in 1/2.5 speed slow reproduction. The slow decode display time determination part 16b outputs the next image display start instruction or the iteration display start instruction at times T921, T922, T923, T924, T925 and T926. The slow decode display time determination part 16b first receives the next image display start instruction from the display time determination part 11b at the time T921. The time T922 is after a lapse of the frame period from the time T921, the time T922 is after a lapse of the frame period from the time T921, and the time T923 is after a lapse of the frame period from the time T922. The slow decode display time determination part 16b outputs the next image display start instruction or the iteration display start instruction every frame period at the times T922, T923, ... with reference to the time T921. The frame period is generated on the basis of the undivided 27 MHz clock signal from the VCXO 12a regardless of the slow reproducing speed.

As shown in FIG. 8, the slow decode display time determination part 16b, receiving the next image display start instruction from the display time determination part 11b at the times T921 and T926, outputs the next image display start instruction. Also at the time T924, the slow decode display time determination part 16b precedently receiving the next image display start instruction from the display time determination part 11b outputs the next image display start instruction. At the times T922, T923 and T925, the slow decode display time determination part 16b outputs the iteration display start instruction.

The MPEG video decode part 10b extracts a DTS of each image from the video PES input from the MPEG system layer decoder 8. The MPEG video decode part 10b reads the count of the STC circuit 9 and starts decoding the corresponding image when the time indicated by the count of the STC circuit 9 matches with the time indicated by the DTS extracted from the video PES. The clock signal obtained by dividing the 27 MHz clock signal output from the VCXO 12a in the slow decode control part 12b according to the reproducing speed is input in the MPEG video decode part 10b, which in turn performs decoding on the basis of the input clock signal. The MPEG video decode part 10b stores the decoded image data in the reference frame 33.

FIGS. 10A to 10D are timing charts showing timings of various output image data in comparison with each other. An image of FIG. 10A is exemplary image data received in the MPEG video decode part 10b from the MPEG system layer decoder 8 in normal reproduction. Image data are input in the MPEG video decode part 10b in order of pictures I0, B0, B1, B2, P0, ... , i.e., in output order. At a time T1001, the DTS of the image data of the picture I0 matches with the count of the STC circuit 9 and the MPEG video decode part 10b starts decoding the image data of the picture P0. At a time T1002, the DTS of the image data of the picture P0 matches with the count of the STC circuit 9, and the MPEG video decode part 10b starts decoding the image data of the picture P0.

Similarly, times T1003, T1004, T1005, T1006 and T1007 are times for starting decoding the picture B0, the picture B1, the picture B2, the picture P1 and the picture B3 respectively. After decoding the image data, the MPEG video decode part 10b outputs the decoded image data to the reference frame 33. When decoding P and B pictures, the MPEG video decode part 10b refers to I and P pictures stored in the reference frame 33.

An image of FIG. 10B shows exemplary image data output from the image data output part 32 to the video encoder 18 when the image data expressed in image of FIG.

10A is input in the MPEG video decode part 10b in normal reproduction. In this example, the image data output part 32 outputs the image data to the video encoder 18 in order of pictures I0, B0, B1, B2, P0, . . . , i.e., in display order.

When the next image display start instruction is input in the image data output part 32 at a time T1011, the image data output part 32 reads the image data of the picture I0 from the reference frame 33 and outputs this image data to the video encoder 18. At a time T1012 when the next image display start instruction is input in the image data output part 32, the image data output part 32 reads the image data of the picture B0 from the reference frame 33 and outputs this image data to the video encoder 18. Thus, the image data output part 32 reads the next image data from the reference frame 33 and outputs this image data to the video encoder 18 when receiving the next image display start instruction from the display time determination part 11b in normal reproduction.

An image of FIG. 10C shows exemplary image data received in the MPEG video decode part 10b from the MPEG system layer decoder 8 in 1/2.5 speed slow reproduction as exemplary slow reproduction. Image data are input in the MPEG video decode part 10b in order of pictures I0, P0, B0, B1, . . . . At a time T1021, the DTS of the image data of the picture I0 matches with the count of the STC circuit 9, and the MPEG video decode part 10b starts decoding the picture I0. At a time T1022, the DTS of the image data of the picture P0 matches with the count of the STC circuit 9, and the MPEG video decode part 10b starts decoding the picture P0. Similarly, the MPEG video decode part 10b starts decoding the picture B0 at a time T1023.

After decoding the image data, the MPEG video decode part 10b outputs the decoded image data to the reference frame 33. The MPEG video decode part 10b, operating according to the clock signal obtained by dividing the clock signal output from the VCXO 12a in the slow decode control part 12b on the basis of the reproducing speed, requires a time 2.5 times that in normal reproduction as the decode time in 1/2.5 speed slow reproduction. When decoding P and B pictures, the MPEG video decode part 10b refers to I and P pictures stored in the reference frame 33.

An image of FIG. 10D shows exemplary image data output from the image data output part 32 to the video encoder 18 when the image data expressed in FIG. 10A is input in the MPEG system layer decoder 8 as exemplary slow reproduction. In this example, the image data output part 32 outputs image data to the video encoder 18 in order of pictures I0, B0, . . . .

When the next image display start instruction or the iteration display start instruction is input from the slow decode display time determination part 16b every frame period, the image data output part 32 reads image data from the reference frame 33 and outputs the read image data to the video encoder 18. When the next image display start instruction is input in the image data output part 32 at a time T1031, the image data output part 32 reads the image data of the picture I0 from the reference frame 33 and outputs the image data to the video encoder 18.

When the iteration display start instruction is input in the image data output part 32 at times T1032 ad T1033, the image data output part 32 reads the image data of the picture I0 from the reference frame 33 again and outputs the read image data to the video encoder 18. The slow decode display time determination part 16b receives the next image display start instruction from the display time determination part 11b at a time T1034, and outputs not the iteration display start instruction but the next image display start instruction to the image data output part 32 at a time T1035 for outputting the display start instruction immediately after the time T1034.

When the next image display start instruction is input in the image data output part 32 at the time T1035, the image data output part 32 reads the image data of the picture B0 to be displayed subsequently to the picture I0 started to be displayed at the precedent time T1033 from the reference frame 33 and outputs the read image data to the video encoder 18. When the iteration display start instruction is input in the image data output part 32 at a time T1036, the image data output part 32 reads the image data of the picture B0 from the reference frame 33 again and outputs the read image data to the video encoder 18.

As hereinabove described, the next image display start instruction or the iteration display start instruction is input in the image data output part 32 every frame period and the image data stored in the reference frame 33 is output to the video encoder 18 also in slow reproduction. The video encoder 18 converts the image data, which is a digital video signal input from the image data output part 32, to an NTSC video signal. The image data output part 32 inputs image data in the video encoder 18 every proper frame period both in normal reproduction and in slow reproduction, whereby the video encoder 18 can convert the input image data to a proper NTSC video signal and output the converted NTSC video signal.

Embodiment 4.

Figure 11:
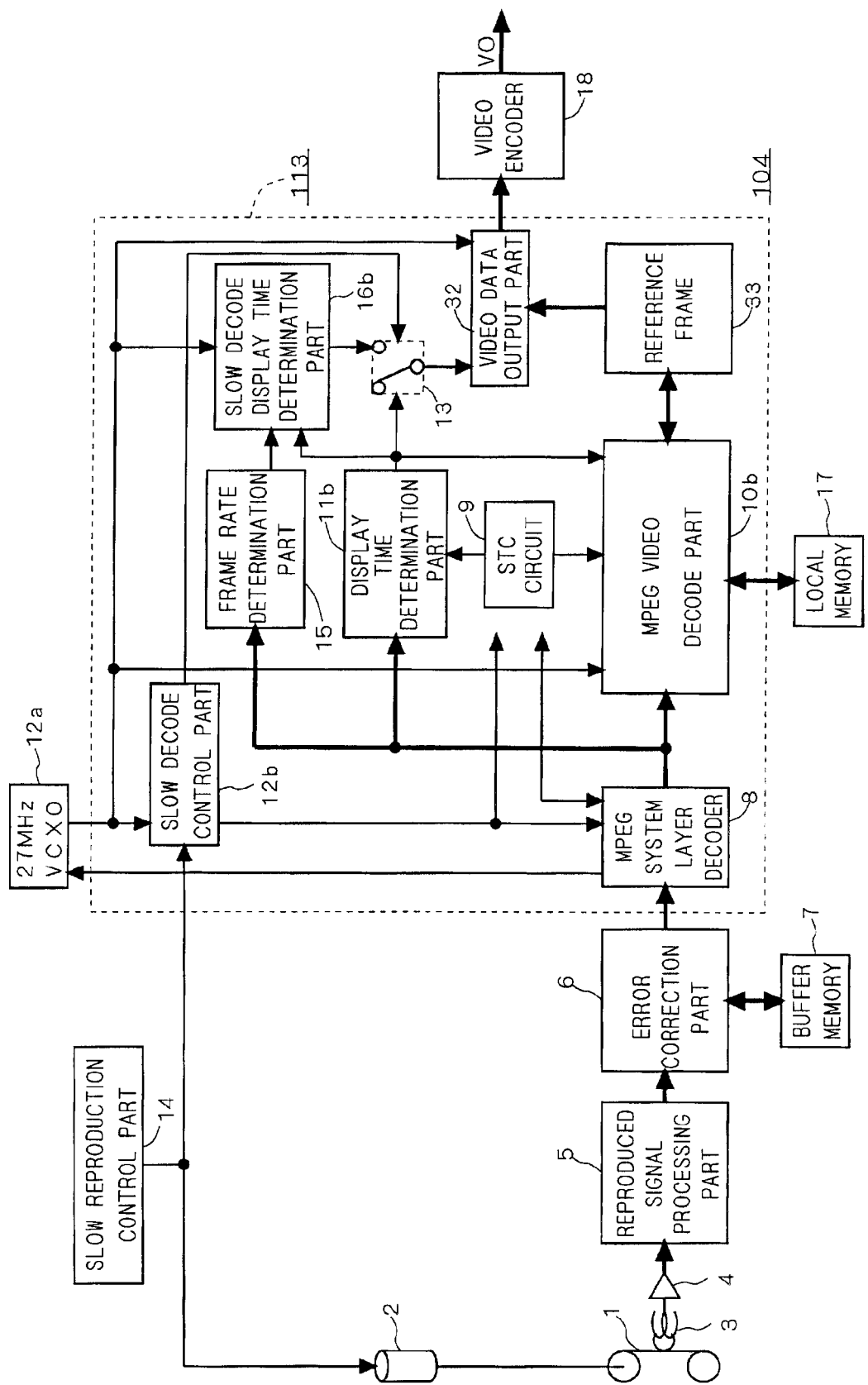
FIG. 11 is a block diagram showing a reproducing unit according to an embodiment 4 of the present invention.

FIG. 11 is a block diagram showing an MPEG data reproducing unit 104 including an MPEG decoder according to an embodiment 4 of the present invention. The MPEG data reproducing unit 104 shown in FIG. 11 comprises an MPEG decoder 114, and is characteristically different from the MPEG data reproducing unit 103 shown in FIG. 6 in relation to part of a signal line transmitting an input signal to an MPEG video decode part 10b. In the MPEG data reproducing unit 104, a 27 MHz clock signal output from a VCXO 12a is input in the MPEG video decode part 10b without being divided in a slow decode control part 12b regardless of a reproducing speed.

A display time determination part 11b reads a PTS indicating a data output (display) timing after decoding from MPEG video data, compares the PTS with a count of an STC circuit 9 performing counting on the basis of a PCR and supplies a control signal for starting outputting (displaying) decoded data to the MPEG video decode part 10b and a slow decode display time determination part 16b when the count of the STC circuit 9 reaches a predetermined approximate value with respect to the PTS.

A frame rate determination part 15 reads frame frequency information, expressing a frame frequency in display, present in the MPEG image data and outputs the same to the slow decode display time determination part 16b. The slow decode display time determination part 16b generates a display control signal in slow reproduction on the basis of the display control signal from the display time determination part 11b, the frame frequency information from the frame rate determination part 15 and a reference clock from the VCXO 12a.

Figure 12:
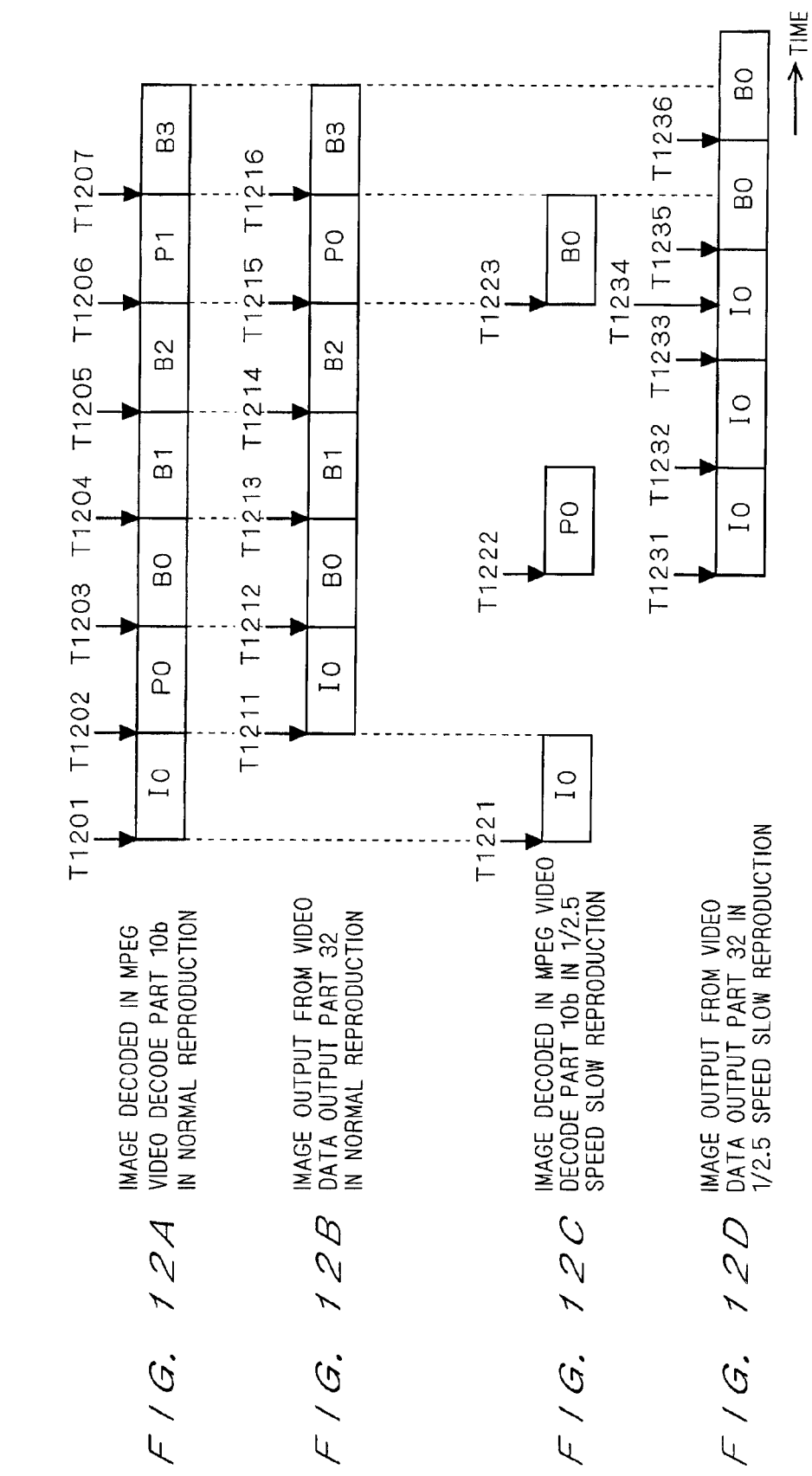
FIGS. 12A to 12D illustrate operations of the reproducing unit shown in FIG. 11.

FIGS. 12A to 12D are timing charts showing timings of various input or output image data in comparison with each other. An image of FIG. 12A shows exemplary image data received by the MPEG video decode part 10b from an MPEG system layer decoder 8 in normal reproduction. Image data are input in the MPEG video decode part 10b in order of pictures I0, P0, B0, B1, B2, P0, . . . . At a time T1201, the DTS of the image data of the picture I0 and the count of the STC circuit 9 match with each other, and the MPEG video decode part 10b starts decoding the picture I0. At a time 1202, the DTS of the picture P0 and the count of the STC circuit 9 match with each other, and the MPEG video decode part 10b starts decoding the picture P0.

Similarly, the MPEG video decode part 10b starts decoding the picture B0, the picture B1, the picture B2, the picture P1 and the picture B3 at times T1203, T1204, T1205, T1206 and T1207 respectively. After decoding the image data, the MPEG video decode part 10b outputs the decoded image data to a reference frame 33. When decoding P and B pictures, the MPEG video decode part 10b refers to I and P pictures stored in the reference frame 33.

An image of FIG. 12B shows exemplary image data output from an image data output part 32 to a video encoder 18 when the image data expressed in the image of FIG. 12A is input in the MPEG system layer decoder 8 in normal reproduction. In this example, the image data output part 32 outputs the image data to the video encoder 18 in order of pictures I0, B0, B1, B2, P0, . . . .

When a next image display instruction is input in the image data output part 32 at a time T1211, the image data output part 32 reads the image data of the picture I0 from the reference frame 32 and outputs this image data to the video encoder 18. At a time 1212 when the next image display instruction is input in the image data output part 32 next, the image data output part 32 reads the image data of the picture B0 from the reference frame 33 and outputs this image data to the video encoder 18. Thus, the image data output part 32 reads next image data from the reference frame 33 when the next image display start instruction is input from the display time determination part 11b and outputs this image data to the video encoder 18 in normal reproduction.

An image of FIG. 12C shows exemplary image data received by the MPEG video decode part 10b from the MPEG system layer decoder 8 in 1/2.5 speed slow reproduction as exemplary slow reproduction. Image data are input in the MPEG video decode part 10b in order of pictures I0, P0, B0, B1, . . . . At a time T1221, the DTS of the picture I0 and the count of the STC circuit 9 match with each other, and the MPEG video decode part 10b starts decoding the picture I0. At a time T1222, the DTS of the picture P0 and the count of the STC circuit 9 match with each other, and the MPEG video decode part 10b starts decoding the picture P0. Similarly, the MPEG video decode part 10b starts decoding the picture B0 at a time T1223.

After decoding image data, the MPEG video decode part 10b outputs the decoded image data to the reference frame 33. The MPEG video decode part 10b, operating with the 27 MHz clock signal output from the VCXO 12a, requires a time identical to that in normal reproduction as a decode time for each image in 1/2.5 speed slow reproduction. When decoding P and B pictures, the MPEG video decode part 10b refers to I and P pictures stored in the reference frame 33.

An image of FIG. 12D shows exemplary image data output from the image data output part 32 to the video encoder 18 when the image data expressed in FIG. 12A is input in the MPEG system layer decoder 8. In this example, the image data output part 32 outputs image data to the video encode 18 in order of pictures I0, B0, . . . .

When the next image display start instruction or an iteration display start instruction is input from the slow decode display time determination part 16b every frame period, the image data output part 32 reads image data from the reference frame 33 and outputs the read image data to the video encoder 18. When the next image display start instruction is input in the image data output part 32 at a time 1231, the image data output part 32 reads the image data of the picture I0 from the reference frame 33 and outputs the read image data to the video encoder 18.

When the iteration display start instruction is input in the image data output part 32 at times T1232 and T1233, the image data output part 32 reads the image data of the picture I0 from the reference frame 33 again and outputs the read image data to the video encoder 18. The slow decode display time determination part 16b receives the next image display start instruction from the display time determination part 11b at a time T1234, and outputs not the iteration display start instruction but the next image display start instruction to the image data output part 32 at a time T1235 for outputting the display start instruction immediately after the time T1234.

When the next image display start instruction is input in the image data output part 3 at a time T1235, the image data output part 32 reads the image data of the picture B0 to be displayed subsequently to the picture I0 started to be displayed at the precedent display start time T1233 and outputs the read image data to the video encoder 18. When the iteration display start instruction is input in the image data output part 32 at a time T1236, the image data output part 32 reads the image data of the picture B0 from the reference frame 33 again and outputs the image data to the video encoder 18.

As hereinabove described, the next image display start instruction or the iteration display start instruction is input in the image data output part 32 every frame period and the image data stored in the reference frame 33 is output to the video encoder 18 also in slow reproduction.

While the invention has been shown and described in detail, the foregoing description is in all aspects illustrative and not restrictive. It is therefore understood that numerous modifications and variations can be devised without departing from the scope of the invention.

What is claimed is:

1. A decoder comprising:
   a decode part receiving and decoding coded data including time control information defining a time related to decoding;
   a processing control part instructing, when said coded data is input in said decode part at a speed slower than an original speed expressed by said time control information, to start decoding said coded data per unit and start outputting decoded data per said unit at a time suitable to said slower speed on the basis of said time control information;
   a storage part temporarily holding said decoded data output from said decode part; and
   an output control part outputting contents for one unit from said decoded data held in said storage part in a period suitable to said original speed on the basis of said time control information.

2. The decoder according to claim 1, wherein
   said processing control part includes:
   a clock generation part generating a reference clock signal,
   a dividing part dividing said reference clock signal with the ratio of said slower speed to said original speed thereby generating a divided clock, and
   a counting part counting said divided clock, and decides timings for starting said decoding and starting said output by comparing a count of said counting part with said time control information.

3. The decoder according to claim 2, wherein
said decode part decodes said coded data in synchronization with said divided clock.
4. The decoder according to claim 2, wherein
said decode part decodes said coded data in synchronization with said reference clock.
5. The decoder according to claim 2, wherein
said output control part includes another counting part counting said reference clock signal and decides said period by comparing a count of said another counting part with said time control information.
6. The decoder according to claim 5, wherein
said output control part regards one of timings for starting output per said unit decided by said processing control part as a starting point for outputting contents of said unit in said period.
7. The decoder according to claim 6, wherein
said coded data is data coded on the basis of MPEG 2-TS standards,
said time control information includes a program clock reference, a presentation time stamp, a decode time stamp and frame frequency information,
said clock generation part adjusts a frequency of said reference clock so that a time indicated by said program clock reference included in said time control information matches with a time indicated by said count of said counting part,
said processing control part decides a timing for starting said decoding on the basis of a result of comparison between said decode time stamp included in said time control information and said count,
said processing control part decides a timing for starting said output on the basis of a result of comparison between said presentation time stamp included in said time control information and said count of said counting part, and
said output control part decides said period on the basis of a result of comparison between said frame frequency information included in said time control information and said count of said another counting part counting said reference clock signal.
8. The decoder according to claim 1, wherein
said storage part holds a newest unit of said decoded data by updating already held data with said decoded data output from said decode part.
9. The decoder according to claim 8, wherein
said coded data is image data including inter-frame predictive-coded data and said unit is one frame,
said storage part also holds image data necessary for decoding said inter-frame predictive-coded data among said decoded data output from said decode part, and
said decode part refers to said image data necessary for decoding said inter-frame predictive-coded data held by said storage part thereby decoding said inter-frame predictive-coded data.
10. A reproducing unit comprising:
a decoder; and
a reproduced signal processing part reading coded data, recorded in a recording medium, including time control information defining a time related to decoding at a speed responsive to an external instruction and inputting said coded data in said decoder, wherein
said decoder includes:
a decode part receiving and decoding said coded data,
a processing control part instructing, when said coded data is input in said decode part at a speed slower than an original speed expressed by said time control information, to start decoding said coded data per unit and start outputting decoded data per said unit at a time suitable to said slower speed on the basis of said time control information,
a storage part temporarily holding said decoded data output from said decode part, and
an output control part outputting contents for one unit from said decoded data held in said storage part in a period suitable to said original speed on the basis of said time control information.

* * * * *